US008249387B2

(12) United States Patent
Jeon et al.

(10) Patent No.: US 8,249,387 B2
(45) Date of Patent: Aug. 21, 2012

(54) IMAGE PROCESSING METHOD AND APPARATUS FOR DETECTING LINES OF IMAGES AND START AND END POINTS OF LINES

(75) Inventors: Jae Wook Jeon, Daejeon (KR); Dong Kyun Kim, Suwon-si (KR); Seung Hun Jin, Suwon-si (KR); Ki Hoon Kim, Suwon-si (KR); Sang Jun Lee, Suwon-si (KR); Tuong Thuy Nguyen, Suwon-si (KR)

(73) Assignee: Sungkyunkwan University Foundation for Corporate Collaboration, Cheoncheon-Dong, Jangan-Gu, Suwon-Si, Gyeonggi-Do (KR)

( * ) Notice: Subject to any disclaimer, the term of this patent is extended or adjusted under 35 U.S.C. 154(b) by 748 days.

(21) Appl. No.: 12/412,558

(22) Filed: Mar. 27, 2009

(65) Prior Publication Data

US 2009/0245687 A1 Oct. 1, 2009

(30) Foreign Application Priority Data

Mar. 31, 2008 (KR) ........................ 10-2008-0029743
Apr. 7, 2008 (KR) ........................ 10-2008-0032241

(51) Int. Cl.
*G06K 9/36* (2006.01)
*G06K 9/48* (2006.01)
*G06K 9/54* (2006.01)

(52) U.S. Cl. ......................... 382/281; 382/199; 382/305

(58) Field of Classification Search .................. 382/104, 382/199, 254, 276, 305, 312, 266, 281; 356/2; 235/456
See application file for complete search history.

(56) References Cited

U.S. PATENT DOCUMENTS 5,796,868 A * 8/1998 Dutta-Choudhury ......... 382/199
6,035,056 A * 3/2000 Karssemeijer ................ 382/132
6,400,848 B1 * 6/2002 Gallagher ..................... 382/254
7,372,550 B2 * 5/2008 Goris et al. .................. 356/4.03
7,437,006 B2 * 10/2008 Bascle et al. .................. 382/228
7,876,926 B2 * 1/2011 Schwartz et al. ............ 382/104

FOREIGN PATENT DOCUMENTS

KR 10-2006-0062154 6/2006

* cited by examiner

*Primary Examiner* — Kanjibhai Patel
(74) *Attorney, Agent, or Firm* — Lexyoume IP Meister, PLLC.

(57) ABSTRACT

Disclosed herein is an image processing method and apparatus for detecting the lines of images and the start and end points of the lines. The image processing apparatus includes an edge creation unit, a Hough transform unit, and an effective parameter detection unit. The edge creation unit creates an edge image using external image data input from the outside. The Hough transform unit performs a Hough transform on information about the pixel coordinates of the edge image created by the edge creation unit. The effective parameter detection unit detects the lines of the edge image by checking effective line parameters using the results of the Hough transform. The image processing apparatus may further include an edge list for storing coordinates of effective pixels constituting the edge image and a line parameter list for storing the effective line parameters.

16 Claims, 27 Drawing Sheets

200
110
100
IMAGE INPUT UNIT
120 EDGE CREATION UNIT
EDGE LIST 161
130 HOUGH TRANSFORM UNIT
PARAMETER CELLS 162
140 EFFECTIVE PARAMETER DETECTION UNIT
EFFECTIVE PARAMETER LIST 163
MEMORY UNIT 160
150 OUTPUT UNIT
IMAGE PROCESSING APPARATUS (A) (B)

(C) (D)

(A)

```
for θ=1; θ<=315; θ=θ+15
   xcos(θ+0)+ysin(θ+0)=σ1
   xcos(θ+1)+ysin(θ+1)=σ2
              .
              .
 xcos(θ+14)+ysin(θ+14)=σ15
end
```

(B)

140
141
142
143
144
160
162
REGISTER
C1
C2
C3
C15
SECOND MAXIMUM VALUE CALCULATOR
REFERENCE VALUE COMPARISON UNIT
COLUMN MAXIMUM VALUE
FIRST MAXIMUM VALUE CALCULATOR
EFFECTIVE PARAMETER DETECTION UNIT
M1
M2
M2
PARAMETER CELLS
MEMORY UNIT (A)

(B)

(C)

(D)

(A)

```
for θ=1; θ<=315; θ=θ+1
    xcos θ + ysin θ = σ
end
```

(B)

(A)

```
for θ=1; θ<=315; θ=θ+15
   xcos(θ+0)+ysin(θ+0)=σ1
   xcos(θ+1)+ysin(θ+1)=σ2
   .
   .
   xcos(θ+14)+ysin(θ+14)=σ15
end
```

(B)

IMAGE PROCESSING METHOD AND APPARATUS FOR DETECTING LINES OF IMAGES AND START AND END POINTS OF LINES

BACKGROUND OF THE INVENTION

1. Field of the Invention

The present invention relates to an image processing method and apparatus for detecting the lines of images and the start and end points of the lines.

2. Description of the Related Art

Computer vision which is used to recognize objects or environments in images by analyzing the images has various application fields. Information important to the recognition of objects or environments is line information. Image processing apparatuses are capable of recognizing objects on the basis of lines, and are also capable of detecting the lanes of roads.

The Hough transform is used as a method for detecting lines that are present in images. In the Hough transform, an original image is transformed into an edge image having edge information and then the parameters of lines that are influenced by all edge points of the obtained edge image are extracted. Line detection using the Hough transform is widely used because it is robust in the case where noise is present in an image or where there is variation in brightness.

However, in order to perform the Hough transform, it is necessary to perform repetitive operations on all edge points and persistent memory access based on corresponding operation results, so that the time required for the operations is long and a large memory space is required. In spite of the superior line detection performance of the Hough transform, the Hough transform is not suitable for application in the actual industry fields due to the disadvantage of its slow performance speed.

SUMMARY OF THE INVENTION

Accordingly, the present invention has been made keeping in mind the above problems occurring in the prior art, and an object of the present invention is to provide an image processing method and apparatus that use a parallel Hough transform technique for performing a Hough transform in parallel so as to increase the performance speed of the Hough transform and a divisional parameter space technique for reducing the amount of memory required for a parameter space.

Another object of the present invention is to provide an image processing method and apparatus that can detect the accurate start and end points of lines using an edge image acquired from an original image and line parameters acquired as the results of the Hough transform.

In order to accomplish the above objects, in accordance with an aspect of the present invention, there is provided an image processing apparatus for detecting the lines of images, including an edge creation unit for creating an edge image using external image data input from an outside; a Hough transform unit for performing a Hough transform on information about pixel coordinates of the edge image created by the edge creation unit; and an effective parameter detection unit for detecting lines of the edge image by checking effective line parameters using results of the Hough transform.

The image processing apparatus may further include an edge list for storing coordinates of effective pixels constituting the edge image created by the edge creation unit; and a line parameter list for storing the effective line parameters checked by the effective parameter detection unit.

Here, the Hough transform unit may perform the Hough transform on a plurality of edge points for θ values in a predetermined range by calculating the following equation:

$$x\cos\theta + y\sin\theta = \rho$$

where x and y are x and y coordinates values of each edge point, respectively. In this case, the Hough transform unit may perform a plurality of calculations of the equation at one time in a parallel manner. For this purpose, the Hough transform unit may include a plurality of trigonometrical arithmetic units and basic arithmetic units.

The Hough transform unit performs a control for increasing the value of a parameter cell corresponding to ρ and θ acquired using the Equation, by 1.

The effective parameter detection unit determines a parameter corresponding to each cell of the parameter memory to be an effective parameter if a value of the cell of the parameter memory is equal to or greater than a predetermined value. Preferably, the effective parameter detection unit searches for a cell having the maximum of values of a plurality of parameter memory cells in a predetermined region of a parameter space and determines the found cell to be the effective parameter if a value of the found cell is greater than a reference value. For this purpose, the effective parameter detection unit may include a first the maximum value calculator for receiving values of the plurality of parameter memory cells for each clock and outputting a maximum value stored in a parameter memory cell having the maximum value; a plurality of registers for temporarily storing maximum cell values output by the first the maximum value calculator; a second maximum value calculator for outputting the maximum of the maximum cell values stored in the plurality of registers; and a reference value comparator for comparing the value output from the second maximum value calculator with the reference value. Here, it is preferred that the plurality of registers have a shift register configuration.

In order to accomplish the above objects, in accordance with another aspect of the present invention, there is provided an image processing method for detecting the lines of images, including the steps of creating an edge image using external image data input from an outside, and detecting effective line parameters by performing a Hough transform on information about pixel coordinates of the created edge image.

The image processing method may further include the steps of storing coordinates of effective pixels constituting the created edge image in an edge list and storing the detected effective line parameters in a line parameter list.

The step of detecting line parameters is performed by detecting the line parameters using resulting values obtained by repeatedly calculating the following equation for a plurality of edge points for θ values in a predetermined range:

$$x\cos\theta + y\sin\theta = \rho$$

where x and y are x and y coordinates values of each edge point, respectively.

In this case, the repeated calculation of the following equation for a plurality of edge points for θ values in a predetermined range is performed at one time in a parallel manner.

Here, the step of detecting line parameters may include the steps of increasing the value of a parameter cell corresponding to ρ and θ acquired using the Equation, by 1, and determining a parameter corresponding to each cell of the parameter memory to be an effective parameter if the value of the cell of the parameter memory is equal to or greater than a predetermined value. In this case, the step of detecting line parameters may further include the steps of searching for a cell having the maximum of values of a plurality of parameter memory cells in a predetermined region of a parameter space, and determining the found cell to be the effective parameter if a value of the found cell is greater than a reference value.

In order to accomplish the above objects, in accordance with still another aspect of the present invention, there is provided an image processing apparatus for detecting the start and end points of lines, including an edge creation unit for creating an edge image using external image data input from an outside and storing it in memory; a Hough transform unit for acquiring line parameters by performing a Hough transform on information about pixel coordinates of the edge image created by the edge creation unit; and a matching unit for detecting start and end points of an infinite line image represented by the detected line parameters using the edge image stored in the memory unit.

The matching unit may acquire only pixels matching the stored edge image from pixels of an infinite line image represented by the line parameters by matching the infinite line image with the edge image, and check start and end points of segments formed by the matching pixels.

The matching unit may perform the process of acquiring only pixels matching the edge image from pixels of the infinite line image by matching the infinite line image with the edge image and checking start and end points of the segments formed by the matching pixels for each of the line parameters.

The image processing apparatus may further include an effective parameter detection unit for detecting effective line parameters from the line parameters on which the Hough transform has been performed.

Furthermore, preferably, the image processing apparatus further include an edge image storage unit for storing coordinates of effective pixels constituting the edge image created by the edge creation unit; and an effective line parameter list for storing the effective line parameters checked by the effective parameter detection unit.

The Hough transform unit may perform the Hough transform on a plurality of edge points for θ values in a predetermined range by calculating the following equation:

$$x \cos \theta + y \sin \theta = \rho$$

where x and y are x and y coordinates values of each edge point, respectively.

The Hough transform unit may perform a plurality of calculations of the equation at one time in a parallel manner.

Here, the Hough transform unit increases a value of a parameter cell corresponding to ρ and θ acquired using the Equation, by 1. The effective parameter detection unit determines a parameter corresponding to each cell of the parameter memory to be an effective parameter if a value of the cell of the parameter memory is equal to or greater than a predetermined value. The effective parameter detection unit searches for a cell having the maximum of values of a plurality of parameter memory cells in a predetermined region of a parameter space and determines the found cell to be the effective parameter if a value of the found cell is greater than a reference value.

In order to accomplish the above objects, in accordance with still another aspect of the present invention, there is provided an image processing method of detecting the start and end points of lines, including the steps of creating and storing an edge image using external image data input from the outside; acquiring line parameters by performing a Hough transform on information about pixel coordinates of the created edge image; and detecting the start and end points of an infinite line image represented by the detected line parameters using the stored edge image.

The step of storing an edge image is performed by storing the coordinates of effective pixels that constitute the created edge image.

The step of detecting the start and end points of an infinite line image may further include the steps of matching the infinite line image with the edge image, acquiring only pixels matching the stored edge image from pixels of an infinite line image represented by the line parameters, and acquiring information about the start and end points of segments formed by the matching pixels by checking them.

In this case, the process of acquiring only pixels matching the edge image from pixels of the infinite line image by matching the infinite line image with the edge image and checking start and end points of the segments formed by the matching pixels is performed for each of the line parameters.

The step of detecting line parameters is performed by detecting the line parameters using resulting values obtained by repeatedly calculating the following equation for a plurality of edge points for θ values in a predetermined range:

$$x \cos \theta + y \sin \theta = \rho$$

where x and y are x and y coordinates values of each edge point, respectively.

In this case, the repeated calculation of the following equation for a plurality of edge points for θ values in a predetermined range is performed at one time in a parallel manner.

Here, the step of detecting line parameters may include the steps of increasing the value of a parameter cell corresponding to ρ and θ acquired using the Equation, by 1, and determining a parameter corresponding to each cell of the parameter memory to be an effective parameter if the value of the cell of the parameter memory is equal to or greater than a predetermined value. In this case, the step of detecting line parameters may further include the steps of searching for a cell having the maximum of values of a plurality of parameter memory cells in a predetermined region of a parameter space, and determining the found cell to be the effective parameter if a value of the found cell is greater than a reference value.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
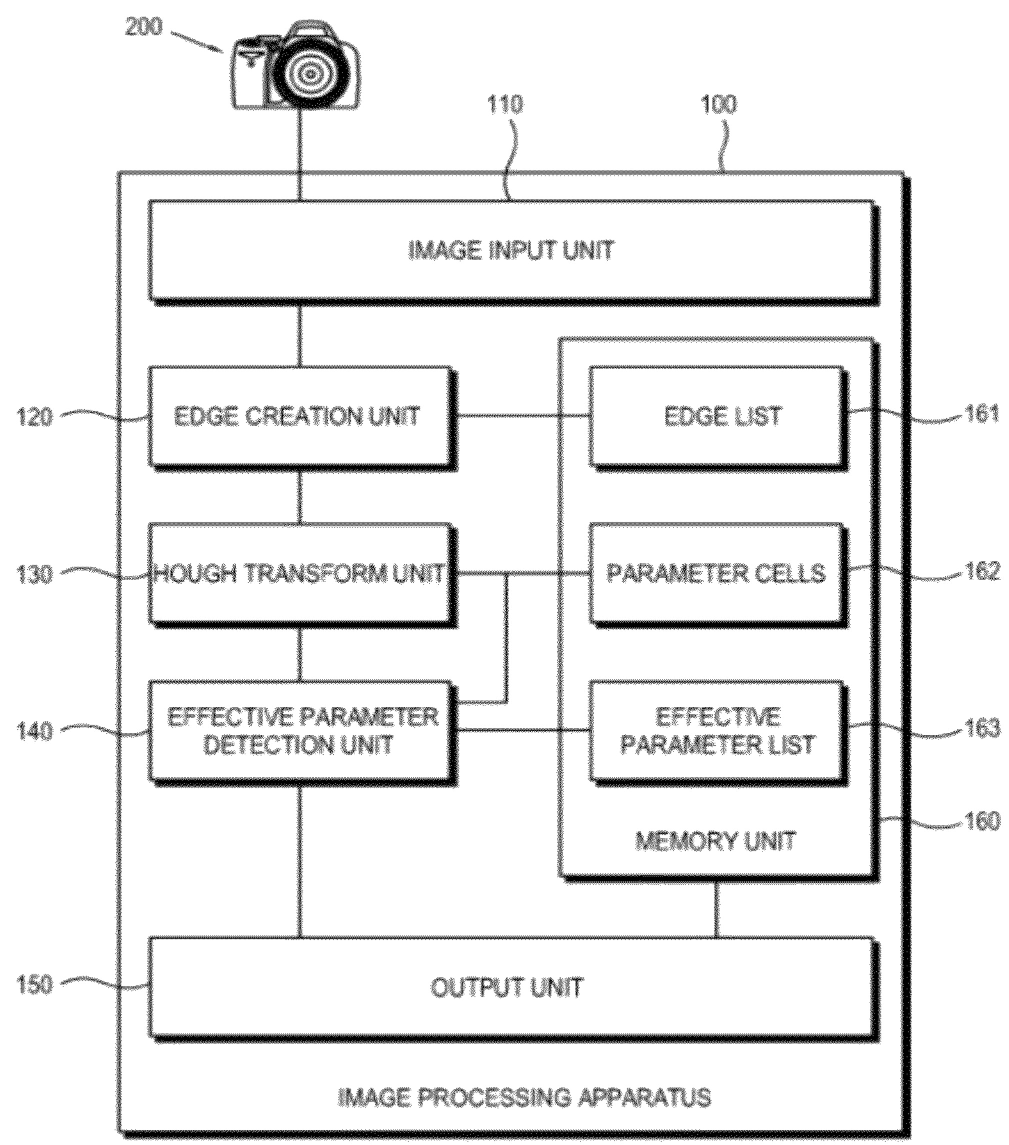
FIG. 1 is a diagram showing the construction of an image processing apparatus according to an embodiment of the present invention.

Reference now should be made to the drawings, in which the same reference numerals are used throughout the different drawings to designate the same or similar components.

An image processing method and apparatus for detecting the lines of images according to the present invention will be described below with reference to the accompanying drawings.

FIG. 1 is a diagram showing the construction of an image processing apparatus according to an embodiment of the present invention.

As shown in FIG. 1, an image processing apparatus 100 operating in connection with a camera 200 includes an image input unit 110, an edge creation unit 120, a Hough transform unit 130, an effective parameter detection unit 140, an output unit 150, and a memory unit 160.

The camera 200 refers to a general device for receiving light through a lens or the like and capturing an external image. The camera 200 shown in FIG. 1 transmits the captured external image to the image input unit 110 of the image processing apparatus 100 according to the present invention using a predetermined wire or wireless communication method.

The image input unit 110 receives external image information from the camera 200, converts the external image information into digital data form, and creates a synchronization signal clock using its own signal or the output signal of the camera 200.

The edge creation unit 120 creates an edge image using digital external image data transmitted from the image input unit 110, and calculates the coordinates of effective pixels that constitute the created edge image. A method of creating edge images will not be described in detail.

The edge list 161 of the memory unit 160 corresponds to storage space for storing the coordinates of the effective pixels that constitute the edge image created by the edge creation unit 120.

The Hough transform unit 130 performs a high-speed Hough transform using the coordinate information of the effective edge pixels stored in the edge list 161. The results of the performance of the Hough transform are stored in the parameter cells 162 of the memory unit 160.

The effective parameter detection unit 140 functions to check effective parameter pairs on the basis of the results of the Hough transform stored in the parameter cell 162, and detect the lines of the image. The effective parameter pairs extracted as described above may be stored in the effective parameter list 163 of the memory unit 160.

The output unit 150 outputs the effective line parameter information stored in the line parameter list 163 in response to a user's request.

Figure 2:
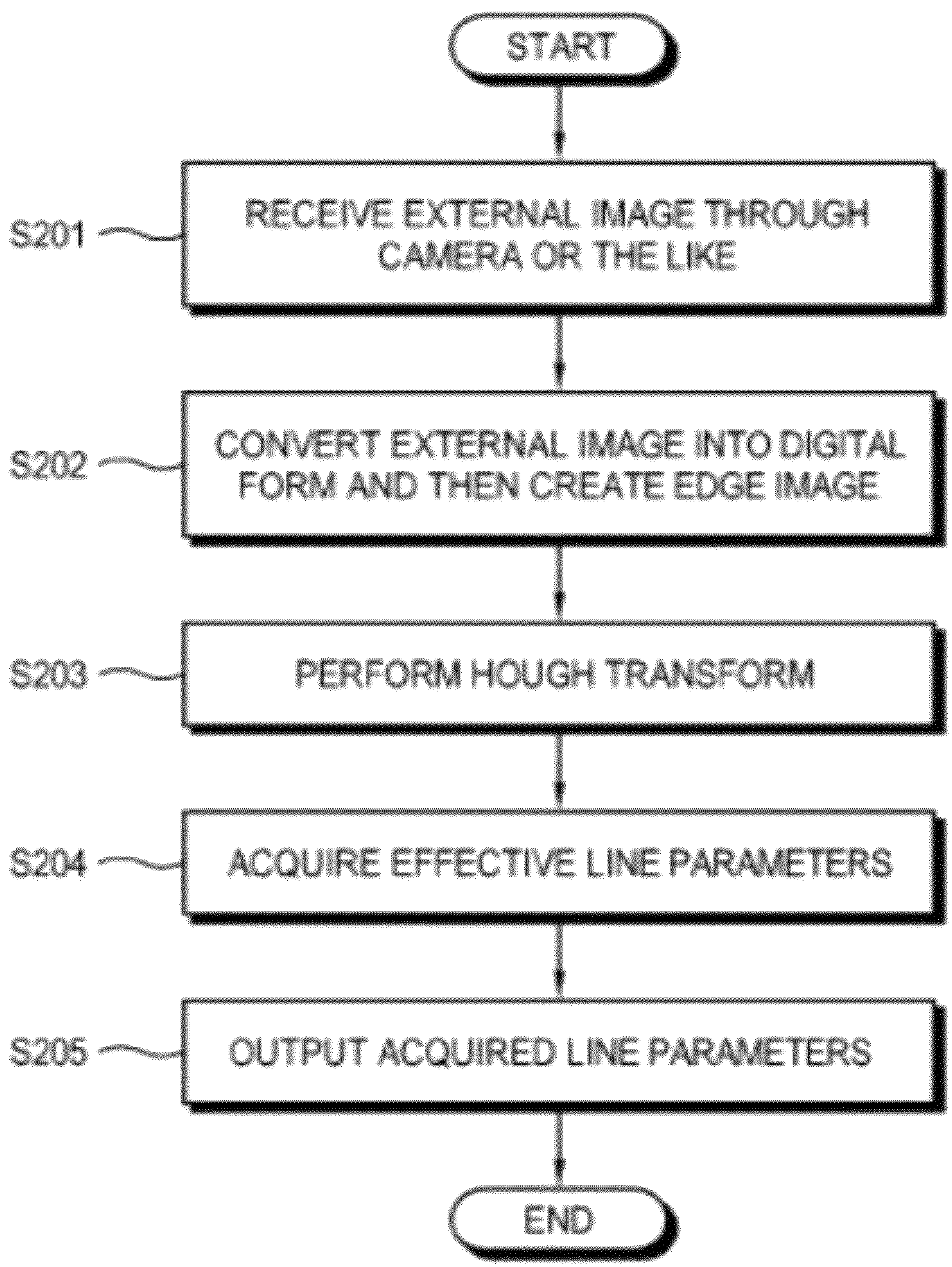
FIG. 2 is a diagram showing an image processing method according to another embodiment of the present invention.

FIG. 2 is a diagram showing an image processing method according to another embodiment of the present invention.

The image processing apparatus 100 receives an external image through an external device such as the camera 200 at step S201.

The image processing apparatus 100 converts the input external image into digital data and then creates an edge image at step S202.

The image processing apparatus 100 performs a Hough transform on the basis of the pixel information of the created edge image at step S203. Thereafter, the image processing apparatus 100 performs a process of acquiring effective line parameters on the basis of the results of the performance of the Hough transform at step S204.

Finally, the image processing apparatus 100 outputs the acquired effective line parameters at step S205.

Figure 3:
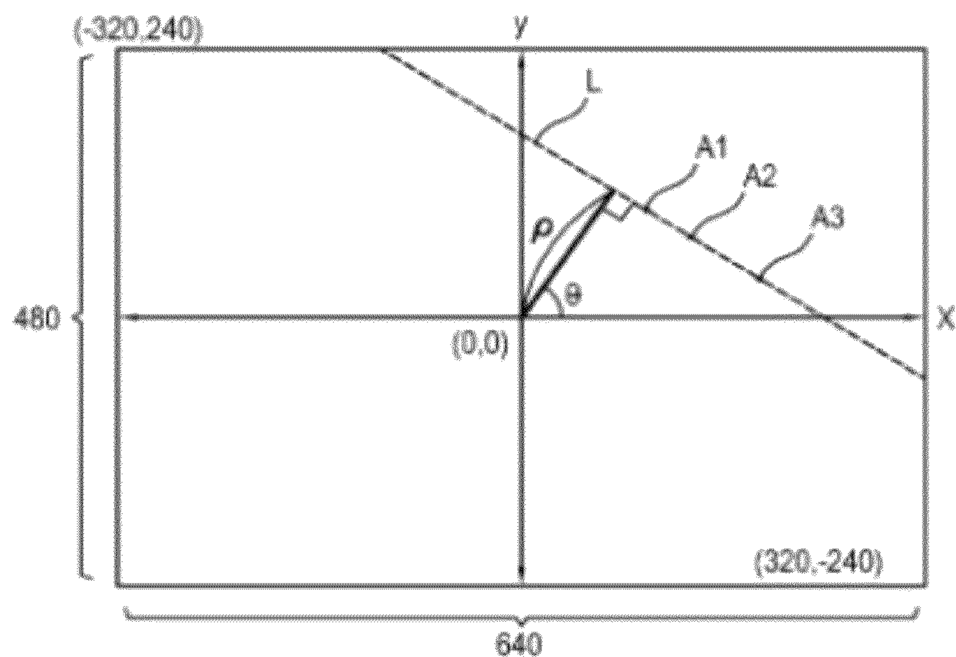
FIG. 3 is a diagram showing an example of a line for performing the Hough transform.

FIG. 3 is a diagram showing an example of a line for performing the Hough transform.

The entire image shown in FIG. 3 may be represented using two-dimensional (2D) information defined by a horizontal X axis and a vertical Y axis and the unique brightness information of pixels corresponding to each point.

For convenience of description, it is assumed that the entire image shown in FIG. 3 has a resolution of 640×480. It is apparent that the resolution of the entire image is not limited to a specific value and can be changed freely.

Line L shown in FIG. 3 may be expressed by the following Equation 1 in the form of a polar equation:

$$x \cos \theta + y \sin \theta = \rho \quad (1)$$

where ρ is the distance between the origin of the entire image at coordinates (0,0) and the line, and θ is the angle between the X axis and the normal line of line L. The above Equation 1 can represent a line in a 2D plane using θ and ρ, and an equation using coordinates (θ,ρ) is referred to as a polar equation. As a result, an infinite line present in a 2D plane can be represented using two parameters θ and ρ.

Meanwhile, the range of the parameters θ and ρ that represent lines in all cases present in the 640×480 image is expressed by the following Equation 2. In the following Equation 2, parameter H is the vertical resolution value of the image, and parameter W is the horizontal resolution value of the image.

Here, the case where the value of ρ is a negative number corresponds to the case where a line is present in the third quadrant. Although the range of θ may be set to $0<\theta<2\pi$ or $-\pi<\theta<\pi$ in order to represent a line located in the third quadrant, the parameters are expressed as the following Equation 2 from the point of view of the efficiency of the Hough transform:

$$0 \le \theta \le \pi - \frac{\sqrt{H^2+W^2}}{2} \le \rho \le + \frac{\sqrt{H^2+W^2}}{2} \quad (2)$$

The image processing method according to the present invention is a process of detecting line A on the basis of the edge points A1, A2 and A3 shown in FIG. 3. In particular, the present invention detects an effective line by measuring the frequency of occurrence of the edge points A1, A2 and A3. This is based on a concept in which a line can be detected by measuring the frequency of occurrence of edge points because the number of edge points located in the line increases in proportion to the number of line components.

Figure 4:
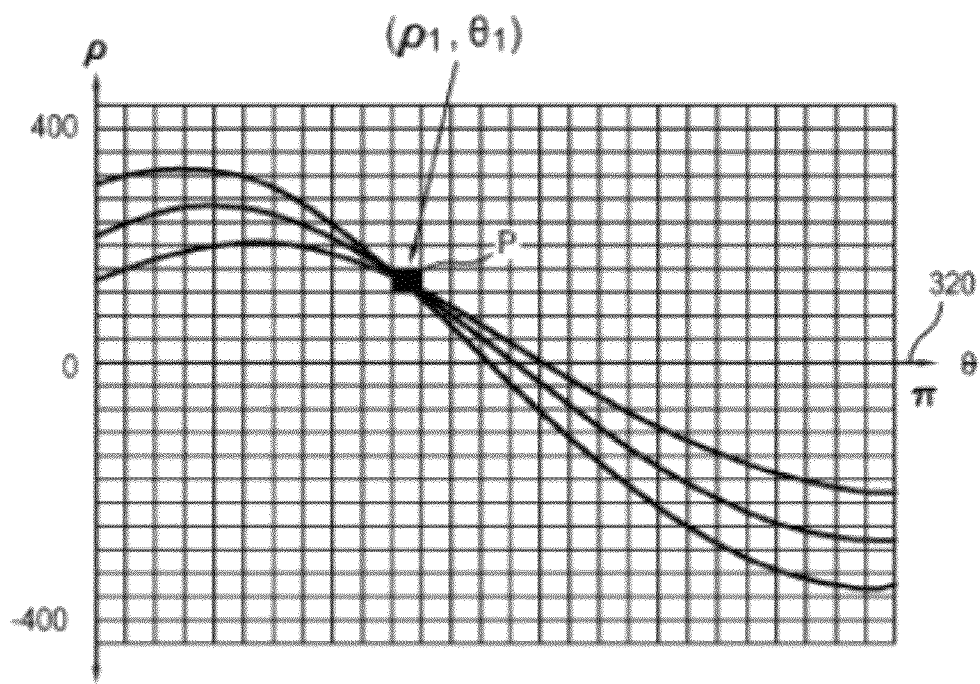
FIG. 4 is a diagram schematically showing the results of the Hough transform using the image processing apparatus according to the present invention.

FIG. 4 is a diagram schematically showing the results of the Hough transform using the image processing apparatus according to the present invention.

The 2D plane shown in FIG. 4 is defined by a ρ axis and a θ axis. In particular, the 2D plane of FIG. 4 is referred to as a "parameter space". The results of the Hough transform shown in FIG. 4 represent lines that may pass through edge points using parameters ρ and θ.

For example, when a Hough transform is performed on the edge points A1, A2 and A3 appearing in the line A of FIG. 3, three sine wave curves appear in the parameter space. Here, one sine wave curve is a set of coordinates (ρ,θ) of lines that may pass through one edge point. In particular, a sine wave curve acquired by performing a Hough transform on the edge point A1 of FIG. 3 represents a plurality of lines that pass through the edge point A1.

A Hough transform is performed on three edge points A1, A2 and A3 in the 2D plane of FIG. 3. Here, a line represented by the coordinates (ρ,θ), that is, (ρ1,θ1), of a point where the three sine wave curves meet is a line that passes through all of the three edge points A1, A2 and A3, and corresponds to the line A of FIG. 3.

The fast Hough transform line detection apparatus according to the present invention can detect an infinite line passing through edge points from information about the edge points using the above characteristic.

An image processing apparatus 100 according to the present invention acquires a sine wave curve for each edge point by performing a Hough transform on each edge point. Thereafter, points through the sine wave curve passes are checked, and the value of memory cell corresponding to each of the points is increased by 1. As a result, a memory cell corresponding to the point (the point P of FIG. 4) where the three curves meet has a value of 3, memory cells corresponding to the remaining curve portion have a value of 1, and memory cells corresponding to the points of regions through which a curve does not pass have a value of 0. The image processing apparatus 100 according to the present invention acquires a line passing through edge points by checking memory cells for values equal to or greater than a predetermined reference value and determining (ρ,θ) pointed by the memory cells.

In the above-described operation, the Hough transform functions to transform the image space of FIG. 3 into the parameter space of FIG. 4. It is very important to find a line to which edge points belong in the image space of FIG. 3. A line formed by edge points can be clearly found by performing a transform into the parameter space of FIG. 4 and detecting memory cells having high values in the parameter space, that is, the parameter (ρ,θ) of the line.

Figure 5:
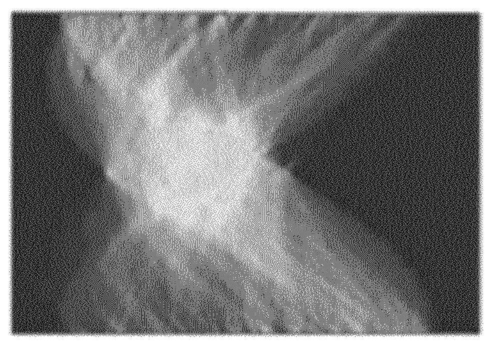
FIG. 5 is a diagram showing the results of line detection using the Hough transform according to the present invention.
Figure 5:
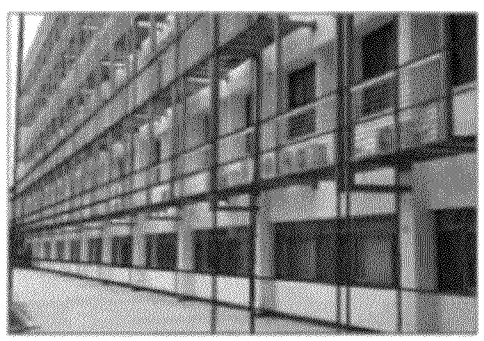

FIG. 5 is a diagram showing the results of line detection using the Hough transform according to the present invention.

Each image of FIG. 5 shows the results of each line detection step using the Hough transform. The photo of FIG. 5(A) corresponds to an original image captured through the camera 200. The image of FIG. 5(B) corresponds to an edge image extracted by detecting edge points from an original image.

The image processing apparatus according to the present invention transforms the edge image of FIG. 5(B) into a parameter space using a Hough transform. The results of drawing sine wave curves for a plurality of edge points appearing in the edge image of FIG. 5(B) and overlapping the sine wave curves correspond to the image of FIG. 5(C).

In the image of FIG. 5(C), dark points are points through which a small number of sine wave curves pass, and bright points are points through which a large number of sine wave curves pass. That is, the brightness of each point depends on the value of a memory cell corresponding to the point. The image processing apparatus 100 according to the present invention checks (ρ,θ) of a point for which the number of sine wave curves that pass though the point is equal to or larger than the predetermined reference value.

Finally, the image of FIG. 5(D) corresponds to an image in which lines have been drawn using (ρ,θ) checked by the image processing apparatus 100. In particular, the image of FIG. 5(D) corresponds to the results of overlapping the lines drawn using (ρ,θ) on the original image of FIG. 5(A). It can be seen that the lines drawn using (ρ,θ) are consistent with the lines of the original image.

Meanwhile, since the image processing apparatus 100 draws lines other than segments having a predetermined length, it can be seen from the image of FIG. 5(D) that pipe-type lines extend to the borders of the entire image.

Figure 6:
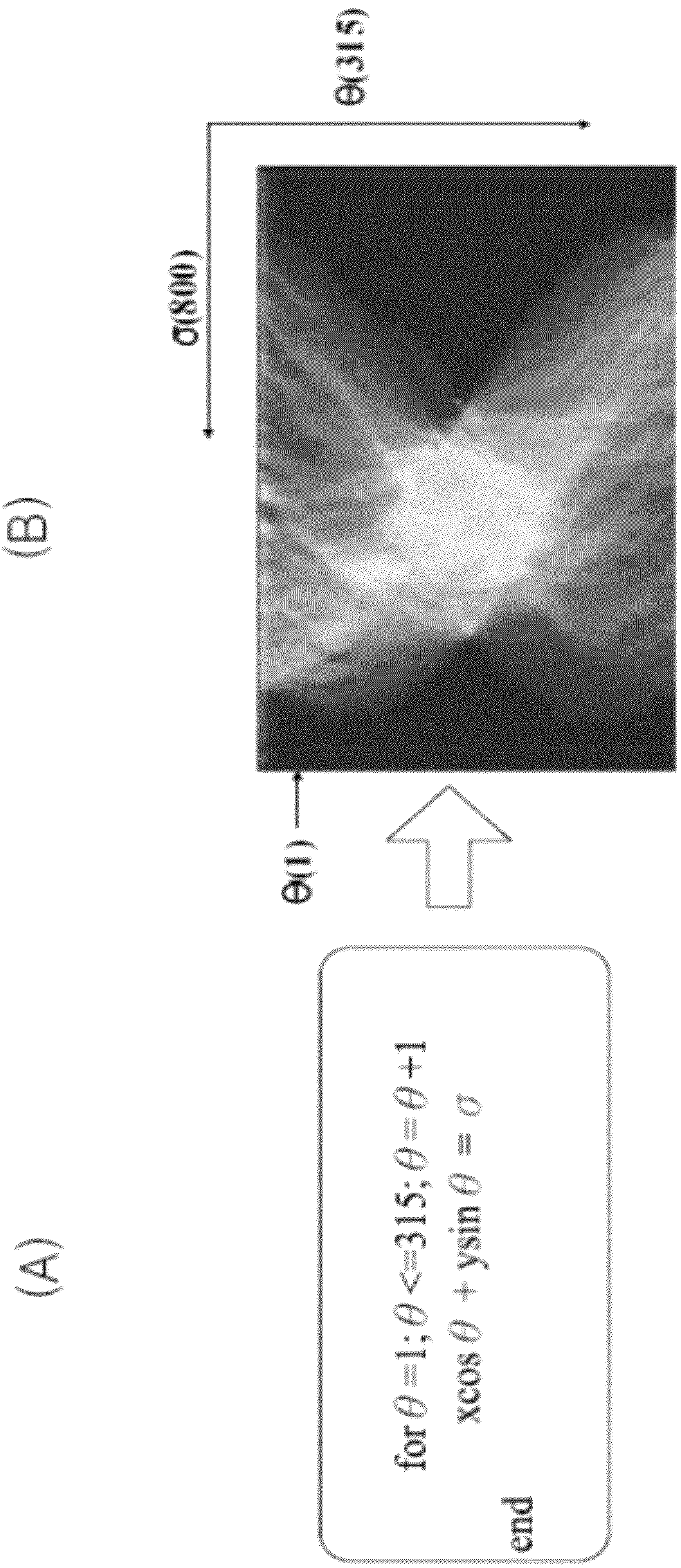
FIG. 6 is a diagram showing an example of the operation of the Hough transform that is performed by the image processing apparatus of the present invention.

FIG. 6 is a diagram showing an example of the operation of the Hough transform that is performed by the image processing apparatus of the present invention.

In the Hough transform of FIG. 6, the image processing apparatus 100 obtains ρ by repeatedly performing the operation of Equation 1 on the coordinates of all edge points in the range of θ. The value of ρ obtained described above is matched with the corresponding value of θ, and is incorporated in the parameter space of FIG. 4.

The value of each of memory cells corresponding to ($\rho$,$\theta$) obtained by performing the operation of Equation 1 is increased by 1, and the brightness of the parameter space is changed according to the values of the memory cells.

However, since the Hough transform illustrated in FIG. 6 repeatedly performs operations in the range of $\theta$ (in FIG. 6, 315), there are disadvantages in that the operational performance time is long and the amount of use of the memory for setting the parameter is increased.

Figure 7:
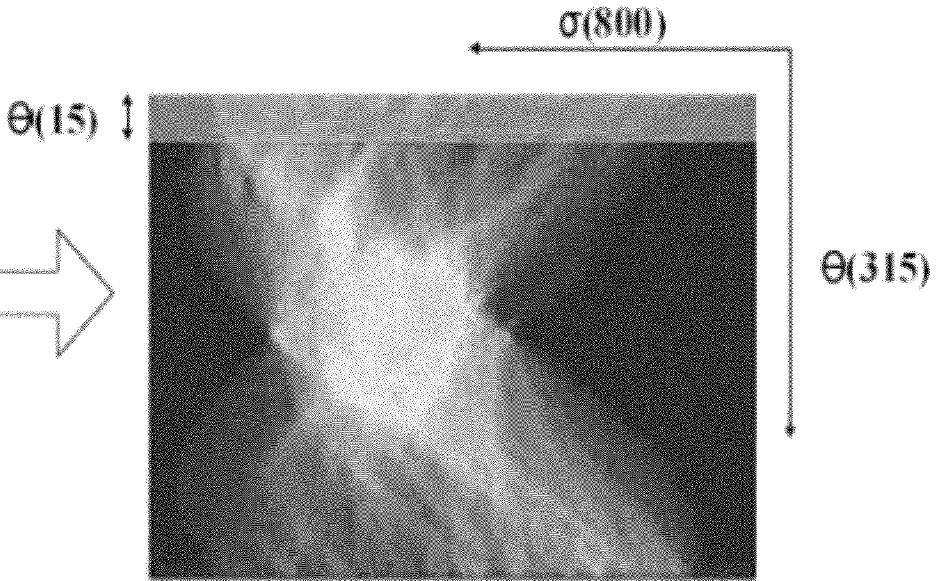
FIG. 7 is a diagram showing another example of the operation of the Hough transform that is performed by the image processing apparatus of the present invention.

FIG. 7 is a diagram showing another example of the operation of the Hough transform that is performed by the image processing apparatus of the present invention.

The gist of the Hough transform method illustrated in FIG. 7 is that a plurality of Equations 1 is performed at one time, that is, the parallel operation of Equation 1 is performed. For convenience of description, it is assumed in FIG. 7 that 15 operations are performed at one time, that is, in a parallel manner.

Since the image processing apparatus 100 can perform 15 Equations 1 at one time, the time required for the performance of the Hough transform is reduced by 1/15. In the Hough transform of FIG. 6, the operation is repeatedly performed on one edge image in the range of parameter $\theta$, that is, 315 times. In contrast, according to the operational method of the Hough transform of FIG. 7, the image processing apparatus 100 performs only 21 repeated operations.

As a result, when the operational method of the Hough transform of FIG. 7 is used, the number of repeated operations is reduced, so that the time required for the performance of the Hough transform is reduced. Furthermore, the amount of memory for storing coordinates ($\rho$, $\theta$) is also reduced.

According to the Hough transform method of the present invention, the space for storing matching count information based on coordinates ($\rho$,$\theta$) is not a single piece of memory with a size of $\theta\times\rho$. In the present invention, 15 pieces of memory with a size of $1\times\rho$ are required.

As a result, since the Hough transform according to the present invention can be implemented using only a small amount of memory, it is excellent from the points of view of implementation cost and efficiency. However, it is difficult to perform the fast Hough transform shown in FIG. 7 in a general Personal Computer (PC). Since a PC performs serial type processing, it cannot perform 15 operations at the same time. That is, although the Equation shown in FIG. 7 is programmed, a PC does not perform 15 operations in a parallel manner but performs them in a sequential manner, so that the time required for the performance of the operations cannot be significantly reduced.

Figure 8:
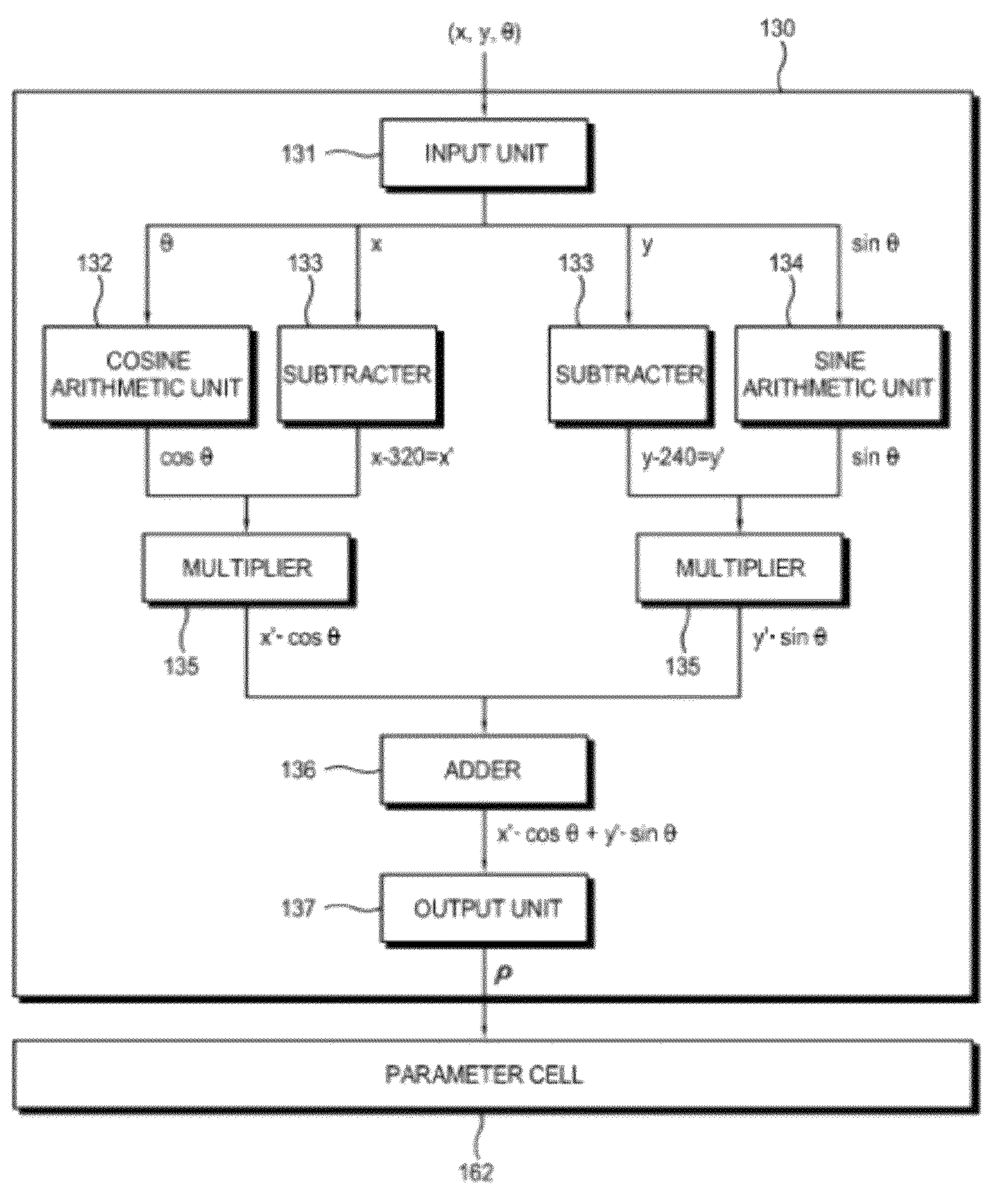
FIG. 8 is a diagram showing the hardware configuration of a Hough transformer for performing the operation of the Hough transform.

FIG. 8 is a diagram showing the hardware configuration of the Hough transformer 130 for performing the operation of the Hough transform.

The Hough transformer 130 shown in FIG. 8 finally outputs $\rho$ when initial value [x,y,$\theta$] is input.

The Hough transformer 130 shown in FIG. 8 may include an input unit 131, a cosine arithmetic unit 132, subtracters 133, a sine arithmetic unit 134, multipliers 135, an adder 136, and an output unit 137.

Referring again to FIG. 3, the 2D plane XY based on the assumption of the present invention has horizontal (X coordinate) values ranging from 1 to 640 and vertical (Y coordinate) values ranging from 1 to 480. Here, in order to reduce the size of the parameter space, the 2D plane is adjusted such that it has horizontal values in the range of −319~320 and vertical values in the range of −239~240 with the center point (320,240) set as the origin. The elements for performing this function are the two subtracters 133 shown in FIG. 8.

Meanwhile, the cosine arithmetic unit 132 and the sine arithmetic unit 134 receive $\theta$ values, respectively, and output a cos $\theta$ value and a sin $\theta$ value, respectively. The multipliers 135 perform an operation of multiplying $x-320=x'$ and the cos $\theta$ value together and an operation of multiplying $y-240=y'$ and the sin $\theta$ value together, respectively. The adder 136 functions to add $x'\cos\theta$ and $y'\sin\theta$ together. A $\rho$ value can be calculated by performing Equation 1 using the above-described construction of the Hough transformer of FIG. 8.

The output unit 137 functions to increase the value of a parameter cell 162 corresponding to the input $\theta$ and the calculated $\rho$ by 1.

Here, the Hough transform illustrated in FIG. 6 may be implemented using a single Hough transformer 130 of FIG. 8. However, in order to perform the Hough transform illustrated in FIG. 7, a plurality of Hough transformers 130 illustrated in FIG. 8 must be configured in a parallel manner.

Figure 9:
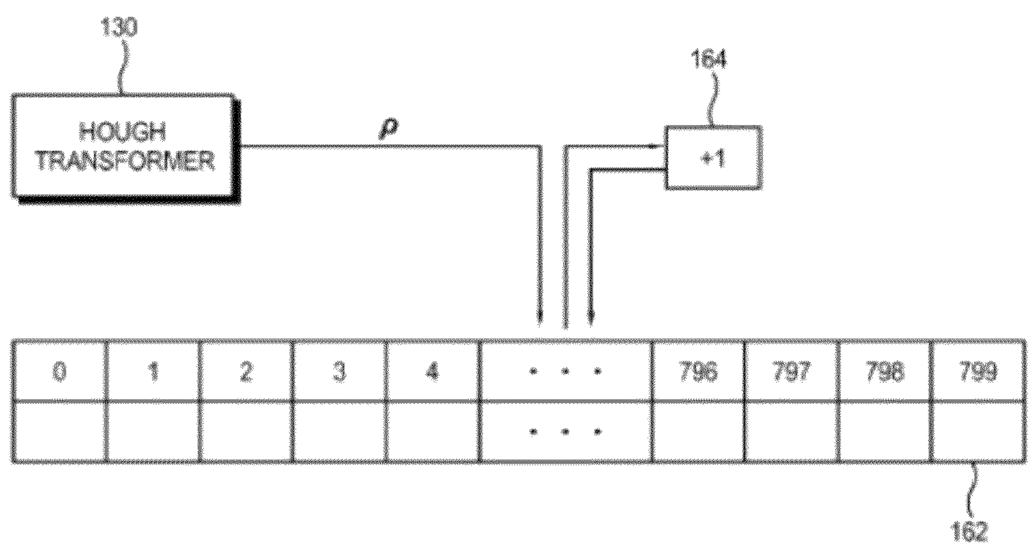
FIG. 9 is a diagram showing the configuration of parameter cells in which the results of the Hough transform of FIG. 7 have been stored.

FIG. 9 is a diagram showing the configuration of parameter cells in which the results of the Hough transform of FIG. 7 have been stored.

As described above, in order to store the results of the fast Hough transform of FIG. 7, the image processing apparatus 100 according to the present invention may include the parameter cells 162 having a $1\times\rho$ configuration.

The parameter cells 162 of FIG. 9 having the $1\times\rho$ configuration are referred to as divisional parameter cells in order to be distinguished from the $\theta\times\rho$ parameter cells required for the Hough transform of FIG. 6.

Assuming that the resolution is 640×480, $\rho$ may have a value in the range from −399 to 400, so that the parameter cells 162 correspond to a total of 800 columns. Referring to FIG. 9, each of the cells with respective addresses 0 to 799 corresponds to each $\rho$.

In the case where a $\rho$1 value is output from the Hough transformer 130 of FIG. 8, the value of a divisional parameter cell corresponding to the $\rho$1 value is increased by 1. In greater detail, the value of the memory cell based on the $\rho$1 value is stored in the temporary buffer 164. A method in which the value of the temporary buffer 164 is automatically increased by 1 and is written in the original parameter cell 162 may be used.

Using the above-described method, divisional parameter memory successively performs an operation of increasing the value of the parameter cell 162 corresponding to the $\rho$ value, which is the results of the operation of the Hough transformer 130 for each $\theta$, by 1.

Figure 10:
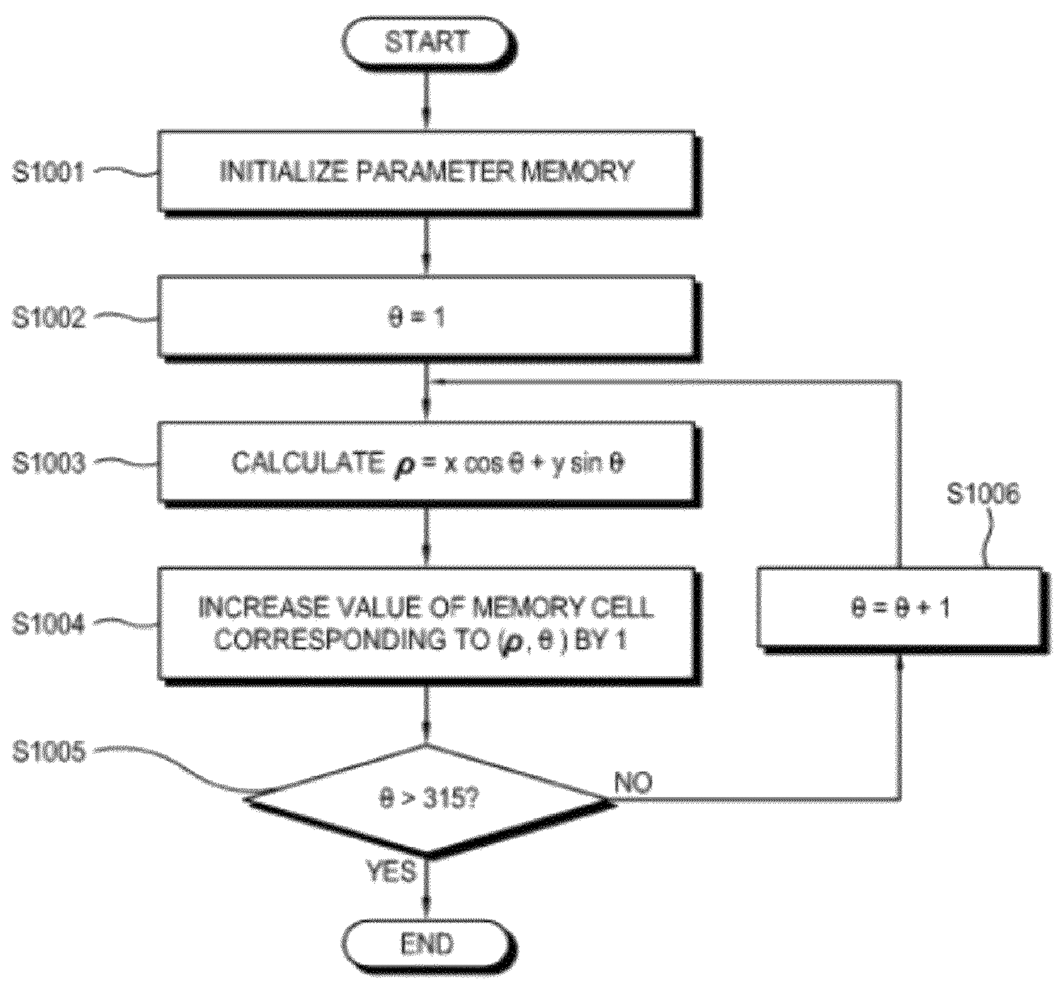
FIG. 10 is a diagram showing a method in which the image processing apparatus according to the present invention performs the Hough transform of FIG. 6.

FIG. 10 is a diagram showing a method in which the image processing apparatus according to the present invention performs the Hough transform of FIG. 6.

First, the image processing apparatus 100 according to the present invention initializes the values of its own parameter memory at step S1001. That is, the values of all parameter cells are set to 0.

The image processing apparatus 100 sets the $\theta$ value to 1 at step S1002. Thereafter, the calculation of Equation 1 is performed using the x and y coordinates of an input edge point and a current $\theta$ value at step S1003.

The image processing apparatus 100 increases the value of a parameter memory cell designated by the current $\theta$ value and the $\rho$ value by 1 at step S1004.

Thereafter, it is determined whether the current $\theta$ value is greater than 315 at step S1005. If the $\theta$ value is not greater than 315, the $\theta$ value is increased by 1, and steps S1003 to S1005 are repeated. If it is determined that the current $\theta$ value is greater than 315 at step S1005, the Hough transform is terminated.

Figure 11:
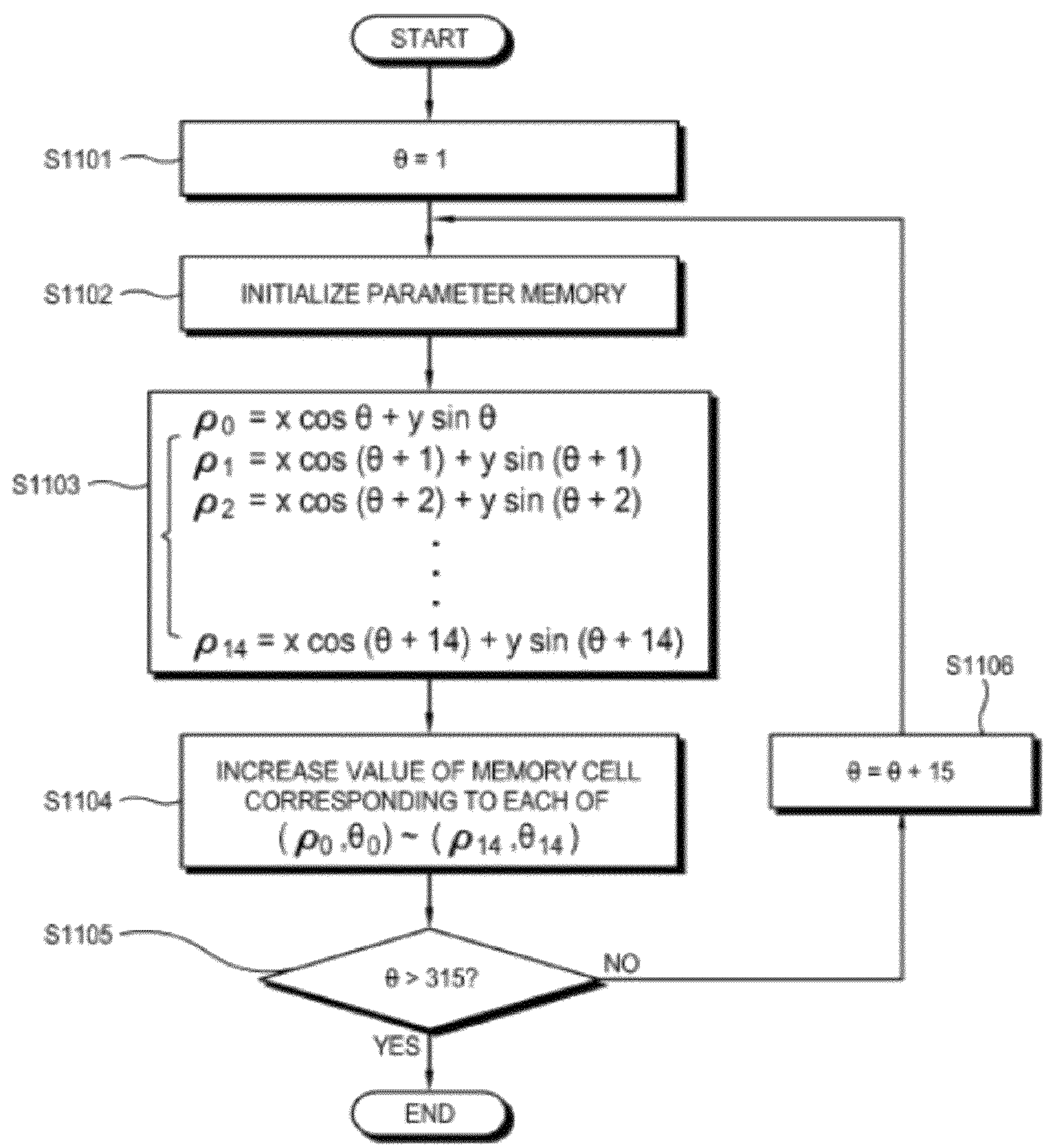
FIG. 11 is a diagram showing a method in which the image processing apparatus according to the present invention performs the Hough transform of FIG. 7.

FIG. 11 is a diagram showing a method in which the image processing apparatus according to the present invention performs the Hough transform of FIG. 7.

First, the image processing apparatus 100 sets the θ value to 1 at step S1001. Thereafter, the image processing apparatus 100 according to the present invention initializes the values of its own parameter memory at step S1102. That is, the values of all parameter cells are set to 0.

After initializing the values of the parameter cells at step S1102, the image processing apparatus 100 performs the 15 equations of FIG. 11 in a parallel manner.

The image processing apparatus 100 increases by 1 each of the values of parameter memory cells designated by 15 pairs of (ρ,θ) obtained by performing the calculation of 15 equations at step S1104.

Thereafter, it is determined whether the current θ value is greater than 315 at step S1105. If the θ value is greater than 315, the θ value is increased by 15, and steps S1102 to S1105 are repeated. If it is determined that the current θ value is greater than 315 at step S1105, the Hough transform is terminated.

Figure 12:
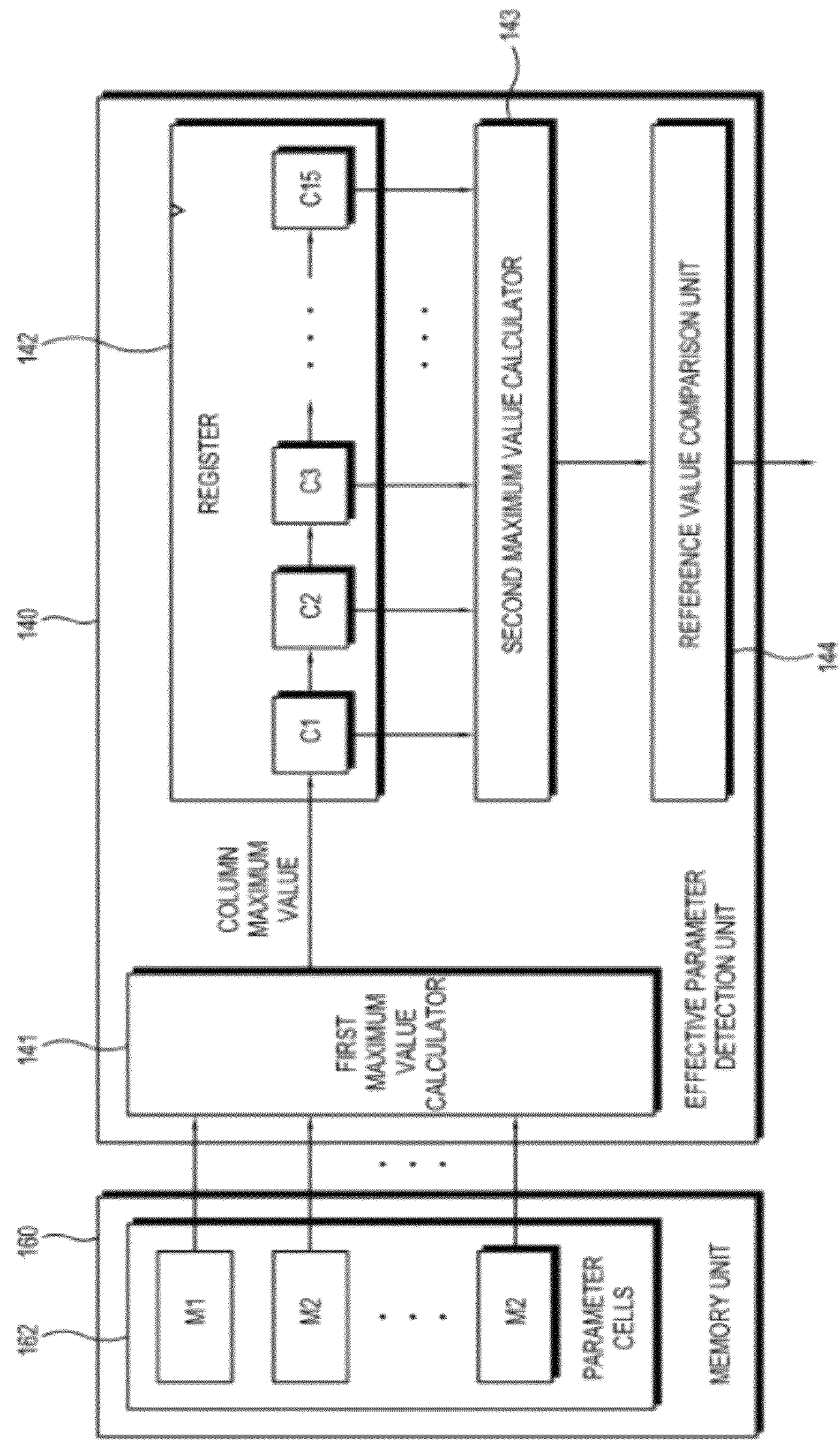
FIG. 12 is a diagram showing the construction of an effective parameter extraction unit for preventing a redundant line from being detected.

FIG. 12 is a diagram showing the construction of an effective parameter extraction unit for preventing a redundant line from being detected.

The reason why a redundant line occurs is that the image processing apparatus cannot search for one parameter pair for one edge line and but detects a line having a parameter value near the accurate parameter pair.

The Hough transformer determines all parameter pairs that satisfy the condition that they are equal to or greater than a predetermined value to be edge lines. Meanwhile, one or more cells around an accurate parameter have great values under the influence of the accurate parameter pair, in which case a redundant line is detected.

In order to solve this problem, the present invention proposes a mechanism of searching for a cell having the maximum value in a predetermined parameter space and determining the maximum value to be an effective parameter pair if the maximum value is greater than a reference value.

As shown in FIG. 12, the effective parameter detection unit may include first and second maximum value calculators, a plurality of registers, and a reference value comparator.

The memory unit 160 shown in FIG. 12 includes 15 pieces of divisional parameter memory. The respective divisional parameter cells 162 output the values of the respective cells ranging from address 0 to address 799. That is, FIG. 12 shows the case where the Hough transform of FIG. 7 is used.

The values output from the divisional parameter cells 162 are input to the first maximum value calculator 141, and the first maximum value calculator 141 acquires the maximum value. Here, since the first the maximum value calculator 141 determines the maximum of the cell values received from the 15 pieces of divisional parameter memory, it corresponds to a 15 to 1 maximum value calculator.

The maximum value acquired by the first the maximum value calculator 141 is the maximum of successive 15 θ values having the same ρ. As a result, this corresponds to a string that has the maximum value in the parameter space of FIG. 4.

The acquired maximum value is input to register C1, which is the leftmost of 15 registers 141. The plurality of registers 141 stores the cell value of a column having the maximum value in each column and the coordinate information (ρ,θ) of a corresponding parameter.

The second maximum value calculator 143 finds the maximum value, that is, the regional maximum value by comparing column maximum values stored in the 15 registers 141. Through the operation of the first and second maximum value calculators, the maximum value in a predetermined 15×15 region and a parameter pair having the maximum value can be detected.

The reference value comparator 144 determines whether the found parameter pair is an effective line parameter pair by comparing the found maximum value with the predetermined reference value.

Meanwhile, the register C1 of the plurality of registers 142 receives the most recent maximum value, and registers C2 to C14 shift their own stored information to their subsequent registers. The final register C15 discards its own stored information. That is, the plurality of registers 142 has a configuration similar to a shift register configuration.

Figure 13:
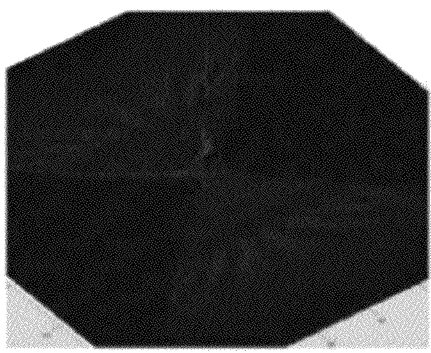
FIG. 13 is a diagram showing resulting images processed by the image processing apparatus according to the present invention.
Figure 13:
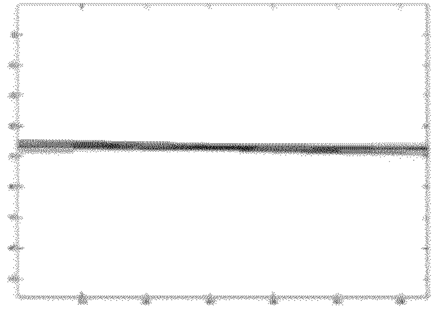
Figure 13:
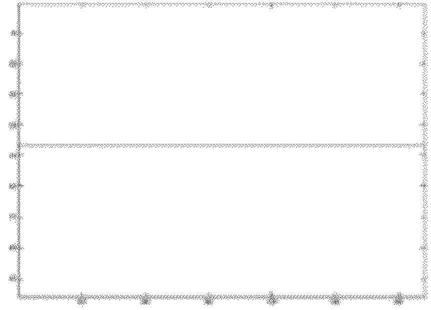

FIG. 13 is a diagram showing resulting images processed by the image processing apparatus according to the present invention.

FIG. 13(A) corresponds to an edge image in which only one line is present. The parameter space, which is a result acquired by performing the Hough transform of FIG. 13(A), can be seen in FIG. 13(B). In FIG. 13(B), as the value of the parameter cell increases, the z coordinate value of a parameter space corresponding to the cell increases.

In this case, from the parameter space of FIG. 13(B), it can be seen that for an edge image in which one line is present, a pyramid-shaped parameter space is created around a point having a predetermined peak value.

In order to detect the parameter of an effective line in a parameter space having the above-described shape, a plurality of redundant lines is detected in the case where only one fixed value is a basis.

FIG. 13(C) shows the results of line detection in the case where the regional maximum value has not been considered. FIG. 13(D) shows the results of line detection in the case where the regional maximum value has been considered. As shown in FIGS. 13(C) and 13(D), a line acquired in the case where the regional maximum value has been considered is clearer.

Figure 14:
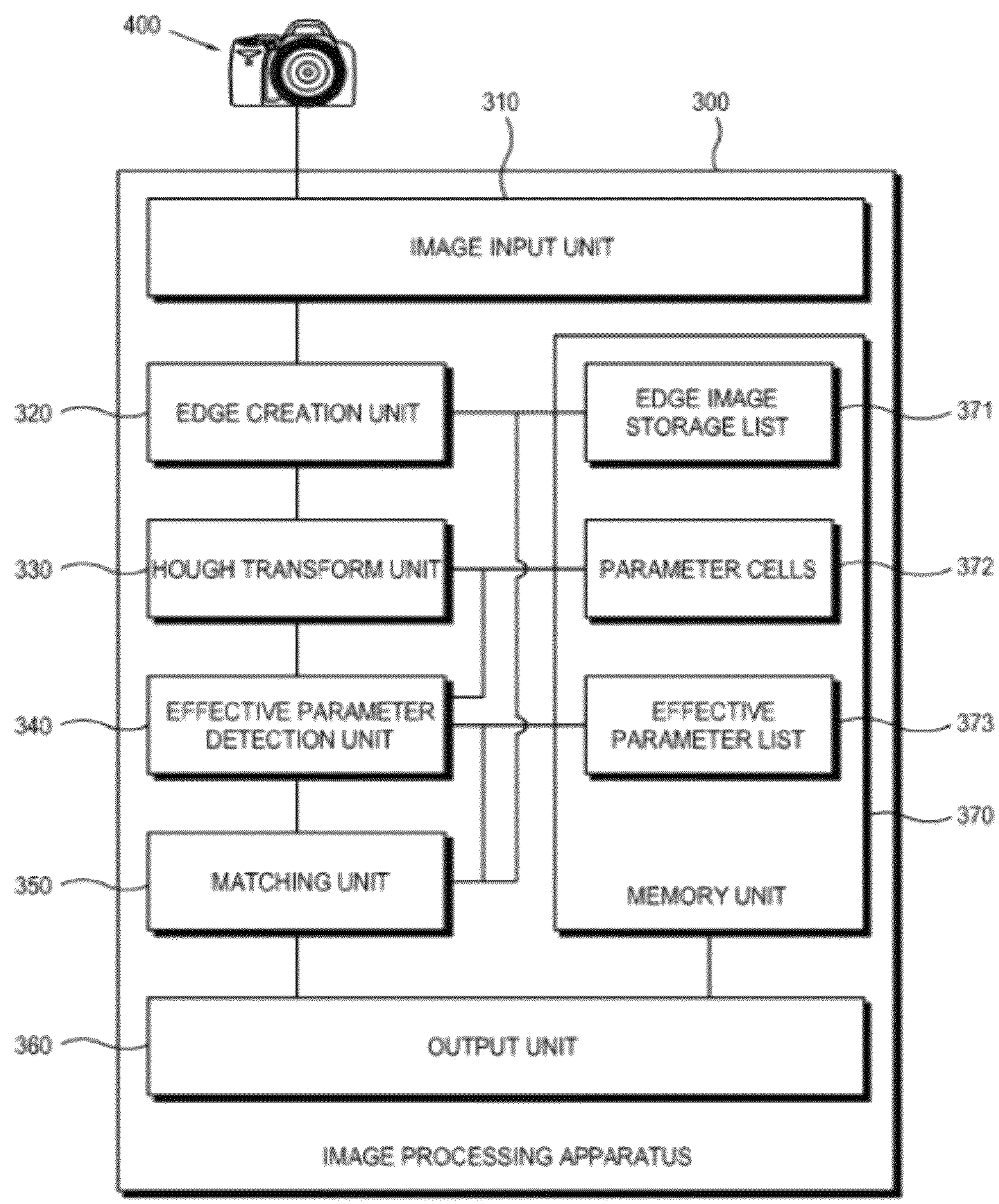
FIG. 14 is a diagram showing the construction of an image processing apparatus according to still anther embodiment of the present invention.

FIG. 14 is a diagram showing the construction of an image processing apparatus according to still another embodiment of the present invention.

As shown in FIG. 14, an image processing apparatus 300 operating in connection with a camera 400 includes an image input unit 310, an edge creation unit 320, a Hough transform unit 330, an effective parameter detection unit 340, a matching unit 350, an output unit 360, and a memory unit 370.

The camera 400 refers to a general device for receiving light through a lens or the like and capturing an external image. The camera 400 shown in FIG. 14 transmits the captured external image to the image input unit 310 of the image processing apparatus 300 according to the present invention using a predetermined wire or wireless communication method.

The image input unit 310 receives external image information from the camera 400, converts the external image information into digital data form, and creates a synchronization signal clock using its own signal or the output signal of the camera 400.

The edge creation unit 320 creates an edge image using digital external image data transmitted from the image input unit 310, and calculates the coordinates of effective pixels that constitute the created edge image. A method of creating edge images will not be described in detail.

The edge information created as described above is stored in the memory unit 370. The area of the memory unit 370 in which the edge image has been stored is referred to as an "edge image storage unit 371."

The Hough transform unit 330 performs a high-speed Hough transform using the coordinate information of the edge pixels stored in the edge image storage unit 371. The results of the performance of the Hough transform are stored in the parameter cells 372 of the memory unit 370.

The effective parameter detection unit 340 functions to check effective parameter pairs on the basis of the results of the Hough transform stored in the parameter cell 372, and detect the lines of the image. The detected lines correspond to infinite lines having no start and end points. The effective parameter pairs extracted as described above may be stored in the effective parameter list 373 of the memory unit 370.

The matching unit 350 corresponds to an element for detecting the start and end points of lines by matching the effective line parameters with the edge image. When the start and end points of the lines are detected, information about segments, that is, finite lines, can be acquired.

The output unit 360 outputs the information about finite line segments acquired by the matching unit 350 or an image drawn on the basis of information about finite line segments in response to a user's request.

Figure 15:
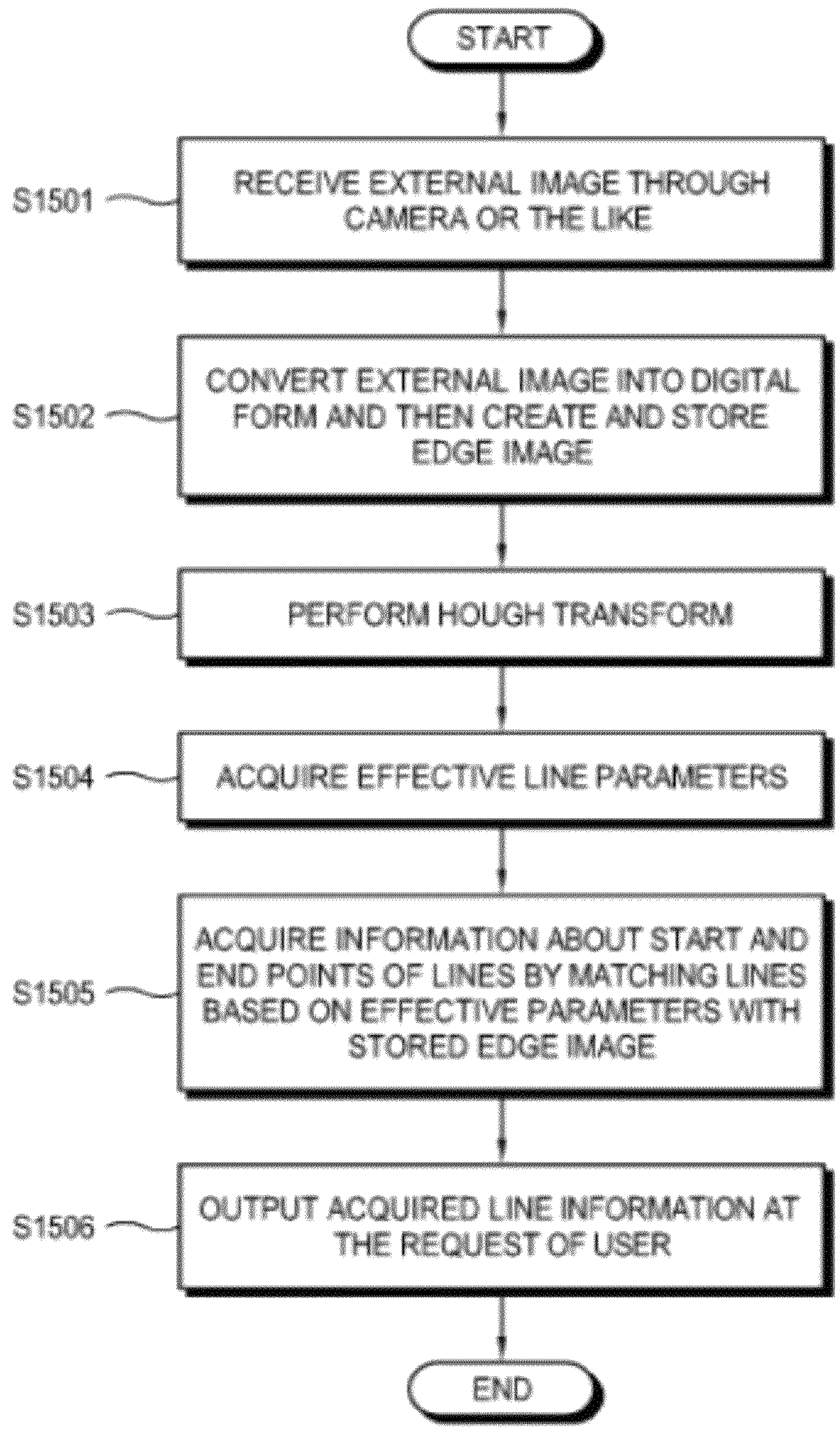
FIG. 15 is a diagram showing an image processing method according to still another embodiment of the present invention.

FIG. 15 is a diagram showing an image processing method according to still another embodiment of the present invention.

The image processing apparatus 300 receives an external image through an external device such as the camera 400 at step S1501.

The image processing apparatus 300 converts the input external image into digital data, creates an edge image, and then stores the information in memory so as to detect the start and end points of infinite lines later at step S1502.

The image processing apparatus 300 performs a Hough transform on the basis of the pixel information of the created edge image at step S1503. Thereafter, the image processing apparatus 300 performs a process of acquiring effective line parameters on the basis of the results of the performance of the Hough transform at step S1504.

The image processing apparatus 300 creates an infinite line image using the acquired effective line parameters, detects the start and end point of infinite lines by matching the infinite line image with the edge image stored at step S1502, and acquires information for restoring the finite line image at step S1505.

The image processing apparatus 300 outputs the acquired finite line image information or the edge image restored on the basis of the acquired finite line image information in response to a user's request at step S1506.

As shown in FIG. 15, the image processing apparatus 300 according to the present invention may store effective line parameters and information about the start and end points of infinite lines restored using the effective line parameters, and restore an image identical to the edge image later.

Figure 16:
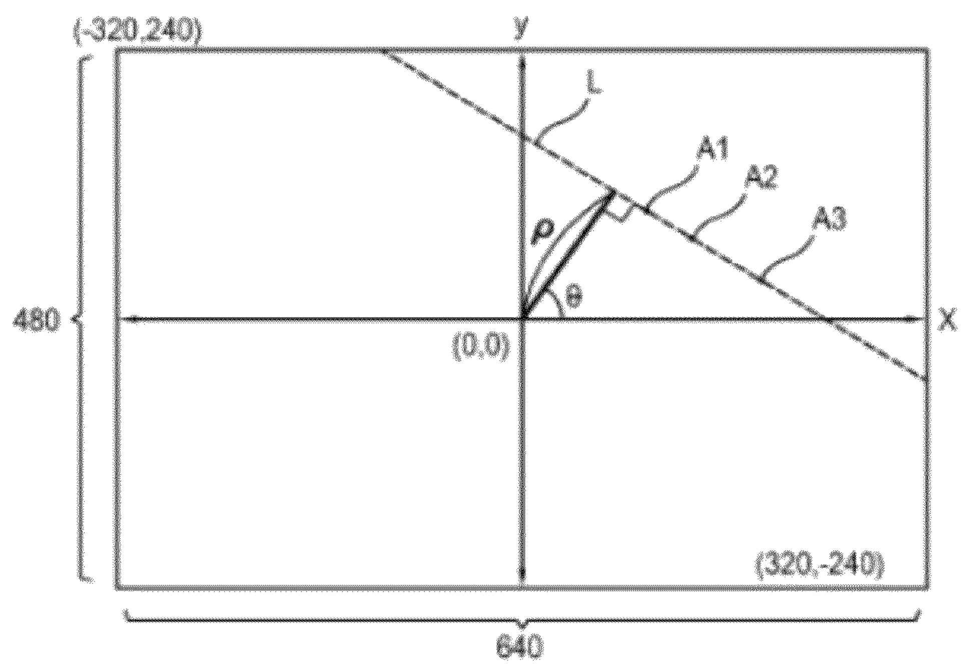
FIG. 16 is a diagram showing an example of a line for performing the Hough transform.

FIG. 16 is a diagram showing an example of a line for performing the Hough transform.

The entire image shown in FIG. 16 may be represented using 2D information defined by a horizontal X axis and a vertical Y axis and the unique brightness information of pixels corresponding to each point.

For convenience of description, it is assumed that the entire image shown in FIG. 16 has a resolution of 640×480. It is apparent that the resolution of the entire image is not limited to a specific value and can be changed freely.

Line L shown in FIG. 16 may be expressed by the following Equation 3 in the form of a polar equation:

$$x\cos\theta + y\sin\theta = \rho \tag{3}$$

where ρ is the distance between the origin of the entire image at coordinates (0,0) and the line, and θ is the angle between the X axis and the normal line of line L. The above Equation 3 can represent a line in a 2D plane using θ and ρ, and an equation using coordinates (θ,ρ) is referred to as a polar equation. As a result, an infinite line present in a 2D plane can be represented using two parameters θ and ρ.

Meanwhile, the range of the parameters θ and ρ that represent lines in all cases present in the 640×480 image is expressed by the following Equation 4. In the following Equation 4, parameter H is the vertical resolution value of the image, and parameter W is the horizontal resolution value of the image.

Here, the case where the value of ρ is a negative number corresponds to the case where a line is present in the third quadrant. Although the range of θ may be set to $0<\theta<2\pi$ or $-\pi<\theta<\pi$ in order to represent a line located in the third quadrant, the parameters are expressed as the following Equation 4 from the point of view of the efficiency of the Hough transform:

$$0 \le \theta \le \pi - \frac{\sqrt{H^2+W^2}}{2} \le \rho \le +\frac{\sqrt{H^2+W^2}}{2} \tag{4}$$

The image processing method according to the present invention is a process of detecting line A on the basis of the edge points A1, A2 and A3 shown in FIG. 3. In particular, the present invention detects an effective line by measuring the frequency of occurrence of the edge points A1, A2 and A3. This is based on a concept in which a line can be detected by measuring the frequency of occurrence of edge points because the number of edge points located in the line increases in proportion to the number of line components.

Figure 17:
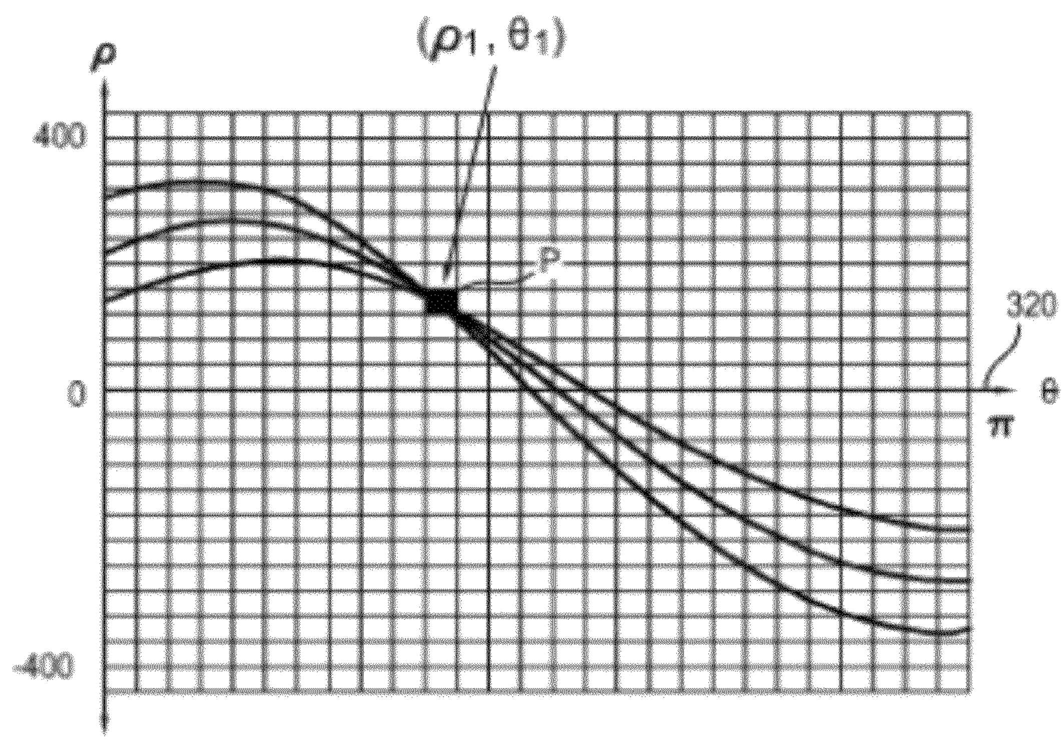
FIG. 17 is a diagram schematically showing the results of the Hough transform using the image processing apparatus according to the present invention.

FIG. 17 is a diagram schematically showing the results of the Hough transform using the image processing apparatus according to the present invention.

The 2D plane shown in FIG. 17 is defined by a ρ axis and a θ axis. In particular, the 2D plane of FIG. 17 is referred to as a "parameter space". The results of the Hough transform shown in FIG. 17 represent lines that may pass through edge points using parameters ρ and θ.

For example, when a Hough transform is performed on the edge points A1, A2 and A3 appearing in the line A of FIG. 16, three sine wave curves appear in the parameter space. Here, one sine wave curve is a set of coordinates (ρ,θ) of lines that may pass through one edge point. In particular, a sine wave curve acquired by performing a Hough transform on the edge point A1 of FIG. 16 represents a plurality of lines that pass through the edge point A1.

A Hough transform is performed on three edge points A1, A2 and A3 in the 2D plane of FIG. 16. Here, a line represented by the coordinates (ρ,θ), that is, (ρ1,θ1), of a point where the three sine wave curves meet is a line that passes through all of the three edge points A1, A2 and A3, and corresponds to the line A of FIG. 16.

The fast Hough transform line detection apparatus according to the present invention can detect an infinite line passing through edge points from information about the edge points using the above characteristic.

An image processing apparatus 300 according to the present invention acquires a sine wave curve for each edge point by performing a Hough transform on each edge point. Thereafter, points through the sine wave curve passes are checked, and the value of memory cell corresponding to each of the points is increased by 1. As a result, a memory cell corresponding to the point (the point P of FIG. 17) where the three curves meet has a value of 3, memory cells corresponding to the remaining curve portion have a value of 1, and memory cells corresponding to the points of regions through which a curve does not pass have a value of 0. The image processing apparatus 300 according to the present invention acquires a line passing through edge points by checking memory cells for values equal to or greater than a predetermined reference value and determining (ρ,θ) pointed by the memory cells.

In the above-described operation, the Hough transform functions to transform the image space of FIG. 16 into the parameter space of FIG. 17. It is very important to find a line to which edge points belong in the image space of FIG. 16. A line formed by edge points can be clearly found by performing a transform into the parameter space of FIG. 17 and detecting memory cells having high values in the parameter space, that is, the parameter (ρ,θ) of the line.

Figure 18:
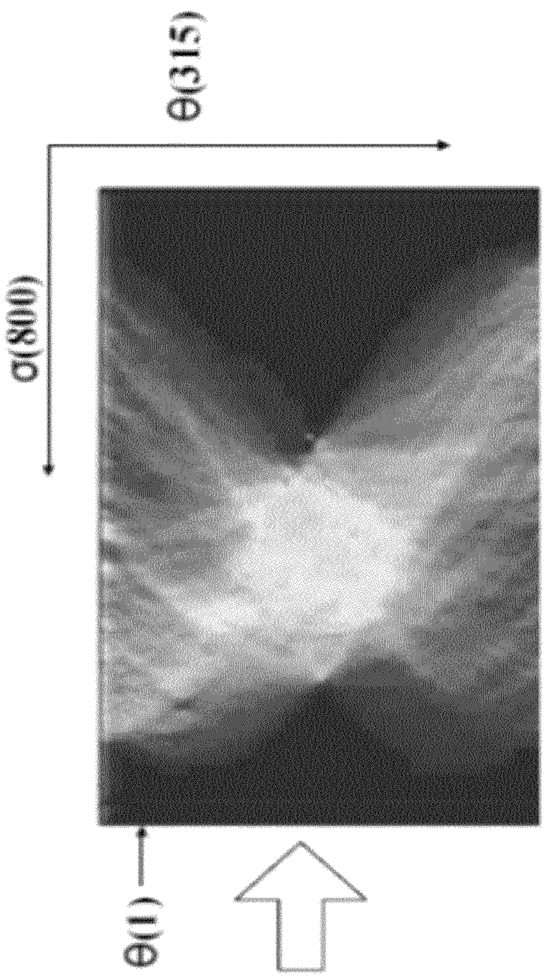
FIG. 18 is a diagram showing an example of the operation of the Hough transform that is performed by the image processing apparatus of the present invention.

FIG. 18 is a diagram showing an example of the operation of the Hough transform that is performed by the image processing apparatus of the present invention.

In the Hough transform of FIG. 18, the image processing apparatus 300 obtains ρ by repeatedly performing the operation of Equation 3 on the coordinates of all edge points in the range of θ. The value of ρ obtained described above is matched with the corresponding value of θ, and is incorporated in the parameter space of FIG. 17.

The value of each of memory cells corresponding to (ρ,θ) obtained by performing the operation of Equation 3 is increased by 1, and the brightness of the parameter space is changed according to the values of the memory cells.

However, since the Hough transform illustrated in FIG. 18 repeatedly performs operations in the range of θ (in FIG. 18, 315), there are disadvantages in that the operational performance time is long and the amount of use of the memory for setting the parameter is increased.

Figure 19:
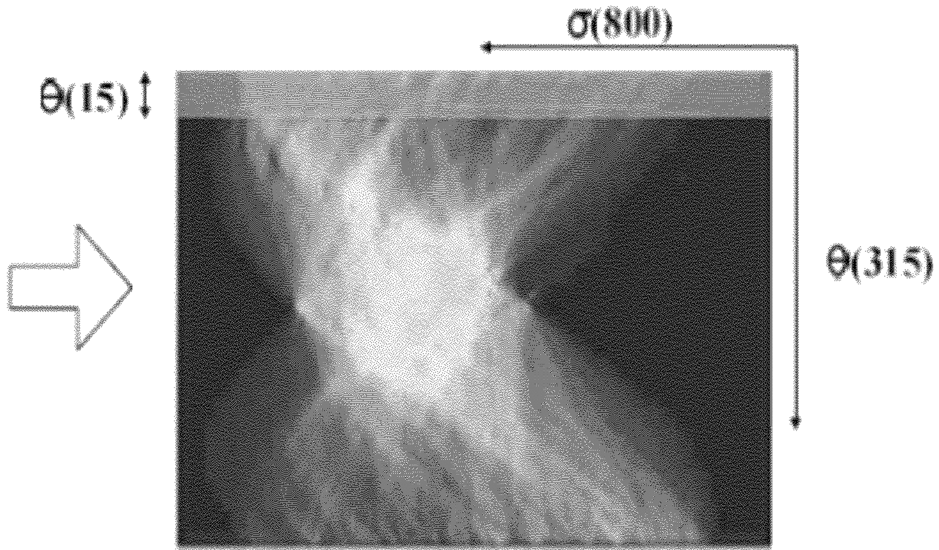
FIG. 19 is a diagram showing another example of the operation of the Hough transform that is performed by the image processing apparatus of the present invention.

FIG. 19 is a diagram showing another example of the operation of the Hough transform that is performed by the image processing apparatus of the present invention.

The gist of the Hough transform method illustrated in FIG. 19 is that a plurality of Equations 3 is performed at one time, that is, the parallel operation of Equation 3 is performed. For convenience of description, it is assumed in FIG. 19 that 15 operations are performed at one time, that is, in a parallel manner.

Since the image processing apparatus 300 can perform 15 Equations 3 at one time, the time required for the performance of the Hough transform is reduced by 1/15. In the Hough transform of FIG. 18, the operation is repeatedly performed on one edge image in the range of parameter θ, that is, 315 times. In contrast, according to the operational method of the Hough transform of FIG. 19, the image processing apparatus 300 performs only 21 repeated operations.

As a result, when the operational method of the Hough transform of FIG. 19 is used, the number of repeated operations is reduced, so that the time required for the performance of the Hough transform is reduced. Furthermore, the amount of memory for storing coordinates (ρ, θ) is also reduced.

According to the Hough transform method of the present invention, the space for storing matching count information based on coordinates (ρ,θ) is not a single piece of memory with a size of θ×ρ. In the present invention, 15 pieces of memory with a size of 1×ρ are required.

As a result, since the Hough transform according to the present invention can be implemented using only a small amount of memory, it is excellent from the points of view of implementation cost and efficiency. However, it is difficult to perform the fast Hough transform shown in FIG. 19 in a general Personal Computer (PC). Since a PC performs serial type processing, it cannot perform 15 operations at the same time. That is, although the equation shown in FIG. 19 is programmed, a PC does not perform 15 operations in a parallel manner but performs them in a sequential manner, so that the time required for the performance of the operations cannot be significantly reduced.

Figure 20:
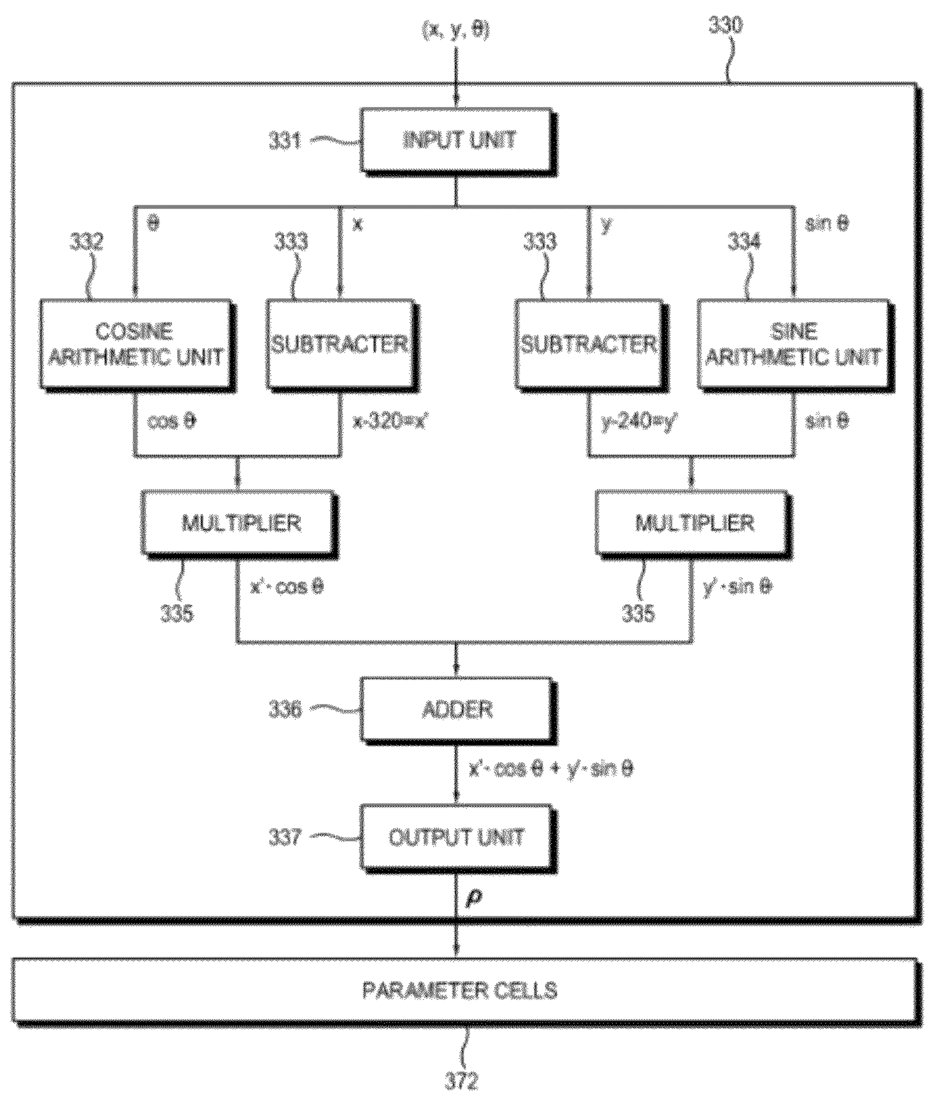
FIG. 20 is a diagram showing the hardware configuration of a Hough transformer for performing the operation of the Hough transform.

FIG. 20 is a diagram showing the hardware configuration of the Hough transformer 330 for performing the operation of the Hough transform.

The Hough transformer 330 shown in FIG. 20 finally outputs ρ when initial value [x,y,θ] is input.

The Hough transformer 330 shown in FIG. 20 may include an input unit 331, a cosine arithmetic unit 332, subtracters 333, a sine arithmetic unit 334, multipliers 335, an adder 336, and an output unit 337.

Referring again to FIG. 16, the 2D plane XY based on the assumption of the present invention has horizontal (X coordinate) values ranging from 1 to 640 and vertical (Y coordinate) values ranging from 1 to 480. Here, in order to reduce the size of the parameter space, the 2D plane is adjusted such that it has horizontal values in the range of −319~320 and vertical values in the range of −239~240 with the center point (320,240) set as the origin. The elements for performing this function are the two subtracters 133 shown in FIG. 20.

Meanwhile, the cosine arithmetic unit 332 and the sine arithmetic unit 334 receive θ values, respectively, and output a cos θ value and a sin θ value, respectively. The multipliers 335 perform an operation of multiplying x−320=x' and the cos θ value together and an operation of multiplying y−240=y' and the sin θ value together, respectively. The adder 336 functions to add x' cos θ and y' sin θ together. A ρ value can be calculated by performing Equation 3 using the above-described construction of the Hough transformer 330 of FIG. 20.

The output unit 337 functions to increase the value of a parameter cell 372 corresponding to the input θ and the calculated ρ by 1.

Here, the Hough transform illustrated in FIG. 18 may be implemented using a single Hough transformer 330 of FIG. 20. However, in order to perform the Hough transform illustrated in FIG. 19, a plurality of Hough transformers 330 illustrated in FIG. 20 must be configured in a parallel manner.

Figure 21:
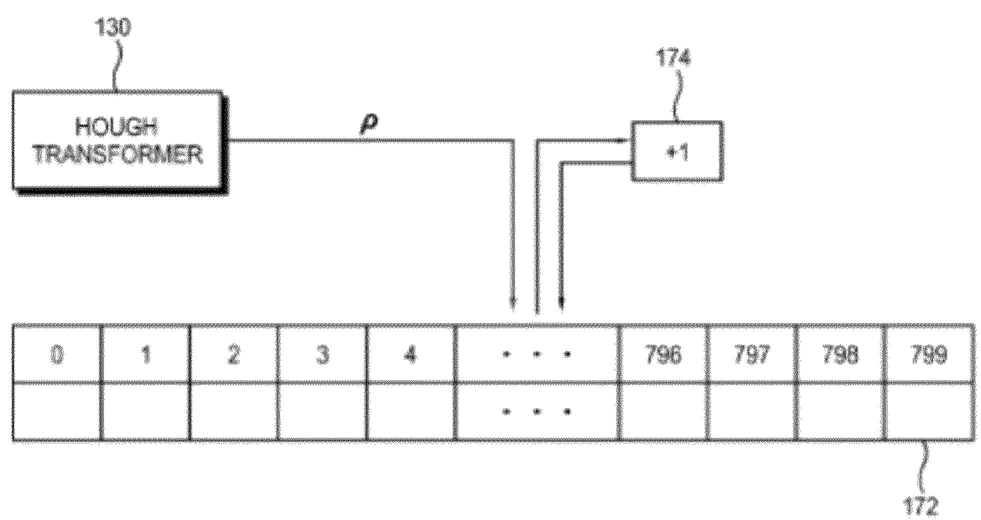
FIG. 21 is a diagram showing the configuration of parameter cells in which the results of the Hough transform of FIG. 19 have been stored.

FIG. 21 is a diagram showing the configuration of parameter cells in which the results of the Hough transform of FIG. 19 have been stored.

As described above, in order to store the results of the fast Hough transform of FIG. 19, the image processing apparatus 300 according to the present invention may include the parameter cells 372 having a 1×ρ configuration.

The parameter cells 372 of FIG. 21 having the 1×ρ configuration are referred to as divisional parameter cells in order to be distinguished from the θ×ρ parameter cells required for the Hough transform of FIG. 18.

Assuming that the resolution is 640×480, ρ may have a value in the range from −399 to 400, so that the parameter cells 372 correspond to a total of 800 columns. Referring to FIG. 21, each of the cells with respective addresses 0 to 799 corresponds to each ρ.

In the case where a ρ1 value is output from the Hough transformer 330 of FIG. 20, the value of a divisional parameter cell corresponding to the ρ1 value is increased by 1. In greater detail, the value of the memory cell based on the ρ1 value is stored in the temporary buffer 374. A method in which the value of the temporary buffer 374 is automatically increased by 1 and is written in the original parameter cell 372 may be used.

Using the above-described method, divisional parameter memory successively performs an operation of increasing the value of the parameter cell 372 corresponding to the ρ value, which is the results of the operation of the Hough transformer 330 for each θ, by 1.

Figure 22:
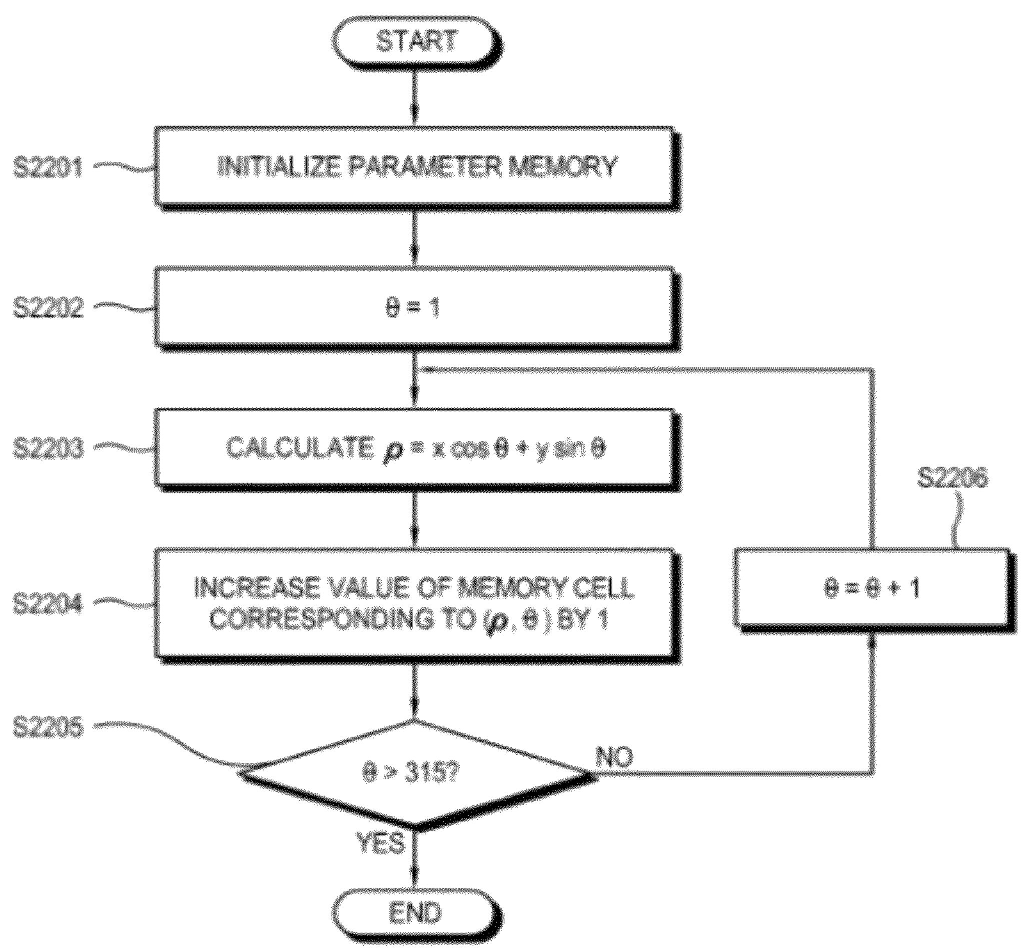
FIG. 22 is a diagram showing a method in which the image processing apparatus according to the present invention performs the Hough transform of FIG. 18.

FIG. 22 is a diagram showing a method in which the image processing apparatus according to the present invention performs the Hough transform of FIG. 18.

First, the image processing apparatus 300 according to the present invention initializes the values of its own parameter memory at step S2201. That is, the values of all parameter cells are set to 0.

The image processing apparatus 300 sets the 0 value to 1 at step S2202. Thereafter, the calculation of Equation 3 is performed using the x and y coordinates of an input edge point and a current θ value at step S2203.

The image processing apparatus 300 increases the value of a parameter memory cell designated by the current θ value and the ρ value by 1 at step S2204.

Thereafter, it is determined whether the current θ value is greater than 315 at step S2205. If the θ value is not greater than 315, the θ value is increased by 1, and steps S2203 to S2205 are repeated. If it is determined that the current θ value is greater than 315 at step S2205, the Hough transform is terminated.

Figure 23:
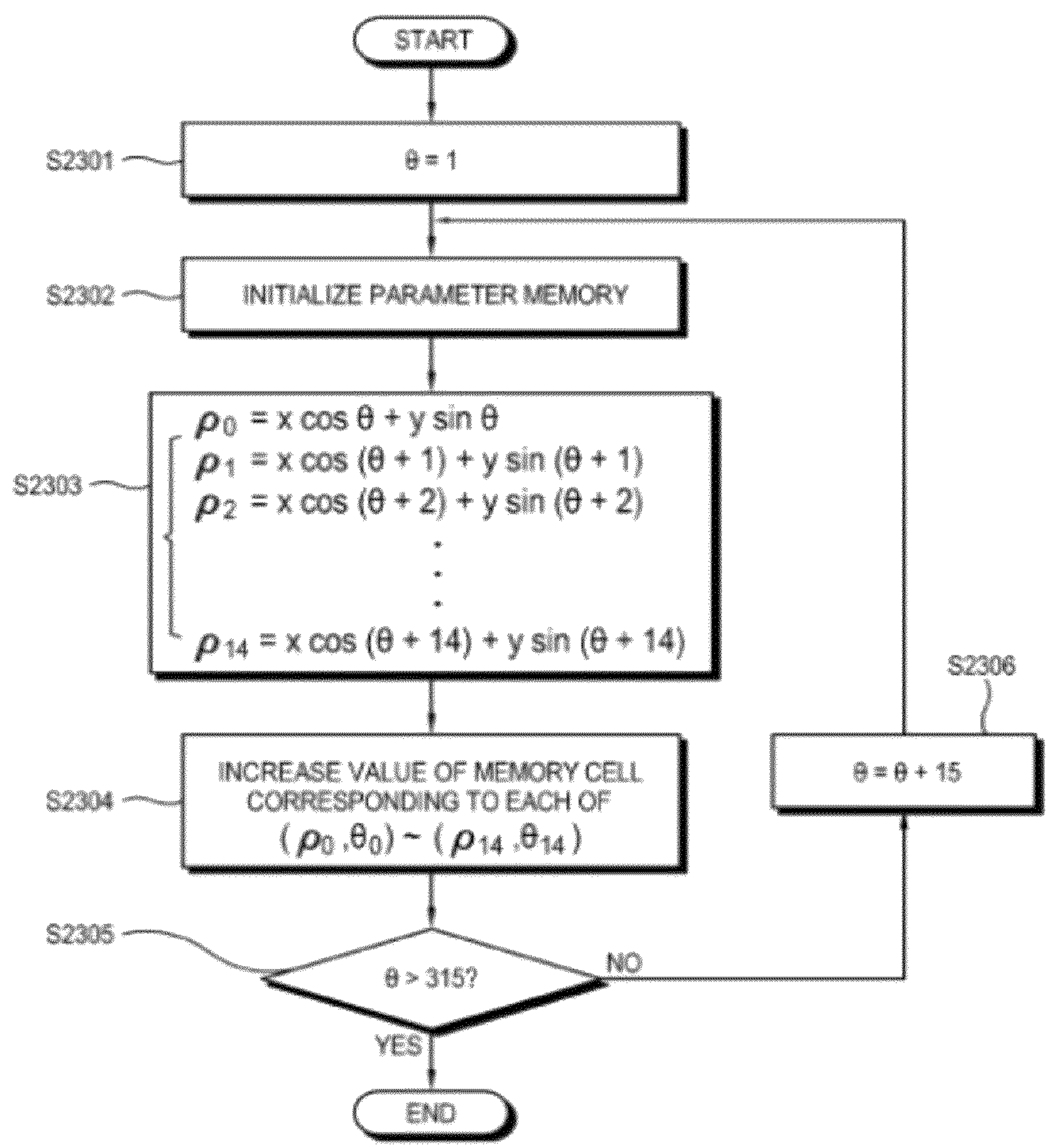
FIG. 23 is a diagram showing a method in which the image processing apparatus according to the present invention performs the Hough transform of FIG. 19.

FIG. 23 is a diagram showing a method in which the image processing apparatus according to the present invention performs the Hough transform of FIG. 19.

First, the image processing apparatus 300 sets the θ value to 1 at step S2301. Thereafter, the image processing apparatus 300 according to the present invention initializes the values of its own parameter memory at step S2302. That is, the values of all parameter cells are set to 0.

After initializing the values of the parameter cells at step S2302, the image processing apparatus 300 performs the 15 equations of FIG. 11 in a parallel manner.

The image processing apparatus 300 increases by 1 each of the values of parameter memory cells designated by 15 pairs of (ρ,θ) obtained by performing the calculation of 15 equations at step S2304.

Thereafter, it is determined whether the current θ value is greater than 315 at step S2305. If the θ value is greater than 315, the θ value is increased by 15, and steps S2302 to S2305 are repeated. If it is determined that the current θ value is greater than 315 at step S2305, the Hough transform is terminated.

Figure 24:
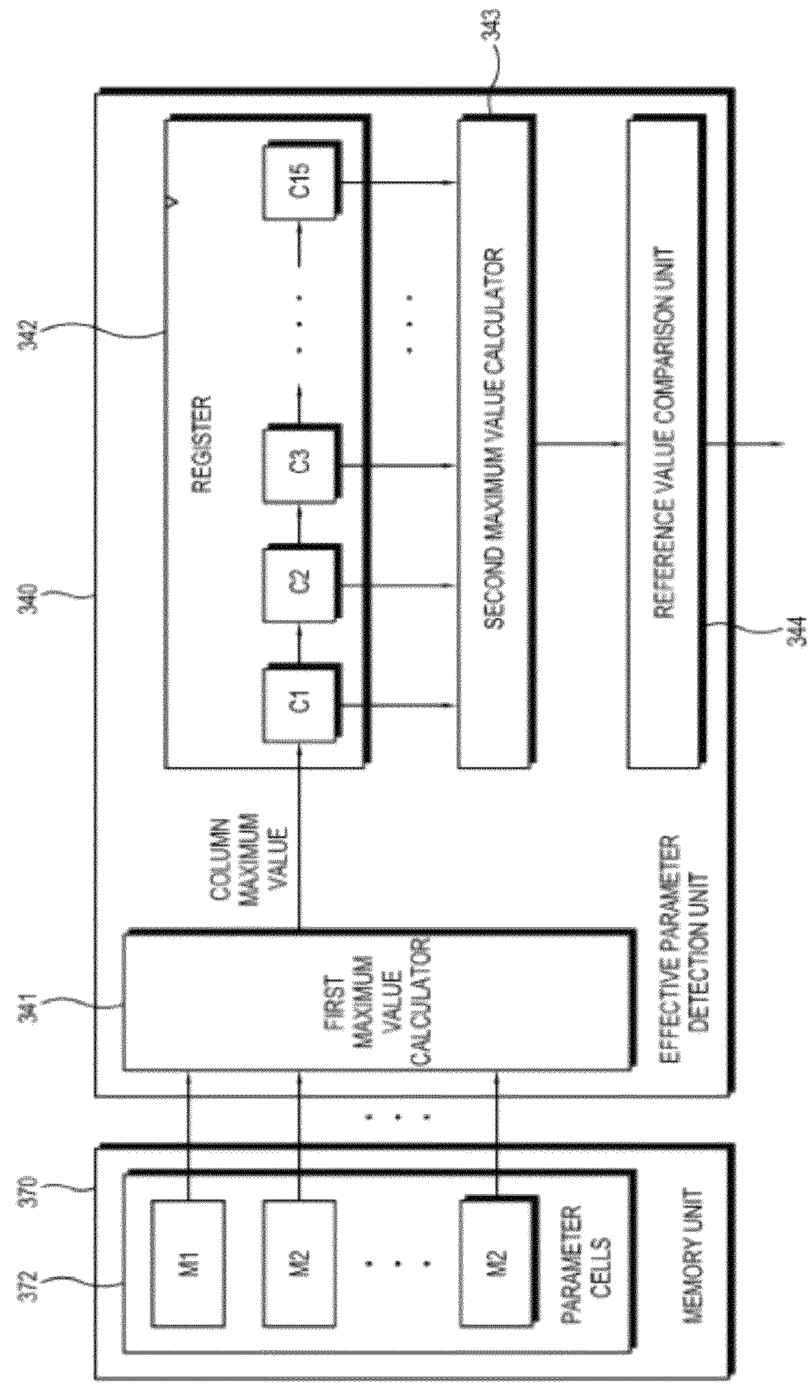
FIG. 24 is a diagram showing the construction of an effective parameter extraction unit for preventing a redundant line from being detected.

FIG. 24 is a diagram showing the construction of an effective parameter extraction unit for preventing a redundant line from being detected.

The reason why a redundant line occurs is that the image processing apparatus cannot search for one parameter pair for one edge line and but detects a line having a parameter value near the accurate parameter pair.

In general, the Hough transformer determines all parameter pairs that satisfy the condition that they are equal to or greater than a predetermined value to be edge lines. Meanwhile, one or more cells around an accurate parameter have great values under the influence of the accurate parameter pair, in which case a plurality of lines is detected.

In order to solve this problem, the present invention proposes a mechanism of searching for a cell having the maximum value in a predetermined parameter space and determining the maximum value to be an effective parameter pair if the maximum value is greater than a reference value.

As shown in FIG. 24, the effective parameter detection unit may include first and second maximum value calculators 341 and 343, a plurality of registers 342, and a reference value comparator 344.

The memory unit 370 shown in FIG. 24 includes 15 pieces of divisional parameter memory. The respective divisional parameter cells 372 output the values of the respective cells ranging from address 0 to address 799. That is, the effective parameter detection unit 340 is applied in the case where the Hough transform of FIG. 19 is used. However, the present method may also be applied in the case where the Hough transform of FIG. 18 is used.

The values output from the divisional parameter cells 372 are input to the first maximum value calculator 341, and the first maximum value calculator 341 acquires the maximum value. Here, since the first the maximum value calculator 341 determines the maximum of the cell values received from the 15 pieces of divisional parameter memory, it corresponds to a 15 to 1 maximum value calculator.

The maximum value acquired by the first the maximum value calculator 341 is the maximum of successive 15 θ values having the same ρ. As a result, this corresponds to a string that has the maximum value in the parameter space of FIG. 17.

The acquired maximum value is input to register C1, which is the leftmost of 15 registers 341. The plurality of registers 341 stores the cell value of a column having the maximum value in each column and the coordinate information (ρ,θ) of a corresponding parameter.

The second maximum value calculator 343 finds the maximum value, that is, the regional maximum value by comparing column maximum values stored in the 15 registers 341. Through the operation of the first and second maximum value calculators, the maximum value in a predetermined 15×15 region and a parameter pair having the maximum value can be detected.

The reference value comparator 344 determines whether the found parameter pair is an effective line parameter pair by comparing the found maximum value with the predetermined reference value.

Meanwhile, the register C1 of the plurality of registers 342 receives the most recent maximum value, and registers C2 to C14 shift their own stored information to their subsequent registers. The final register C15 discards its own stored information. That is, the plurality of registers 342 has a configuration similar to a shift register configuration.

Figure 25:
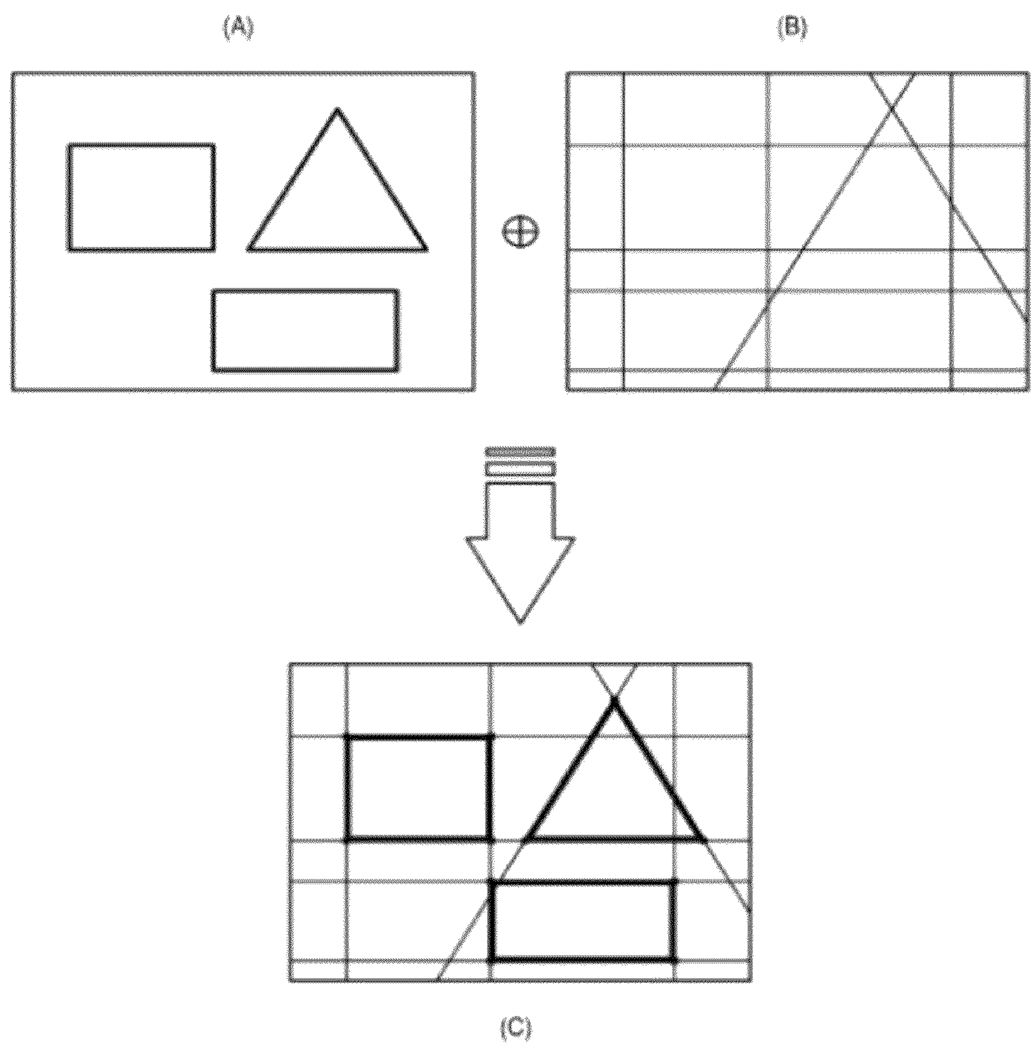
FIG. 25 is a diagram illustrating matching between an edge image and an infinite line image according to the present invention.

FIG. 25 is a diagram illustrating matching between an edge image and an infinite line image according to the present invention.

FIG. 25(A) shows an edge image stored in the edge image storage unit 371 of the image processing apparatus according to the present invention by the edge creation unit 320 of the image processing apparatus 300. Furthermore, FIG. 25(B) corresponds to an infinite line image restored using an effective line parameter that is acquired from the edge image by the image processing apparatus 300.

The matching unit 350 of the image processing apparatus 300 matches the edge image with the infinite line image restored using the effective line parameter, that is, the image of FIG. 25(A) with the image of FIG. 25(B). The matching unit 350 acquires a finite line image (FIG. 25(C)) by selecting only pixels common to the two images.

Furthermore, the matching unit 350 stores, for each effective line parameter pair, information about the start and end points of a finite line image section of the infinite line restored using the effective line parameter in memory unit 370. In summary, the image processing apparatus 300 stores both the effective line parameter values (ρ1,θ1) and the information about the start and end points (α,β) in the memory unit 370.

Figure 26:
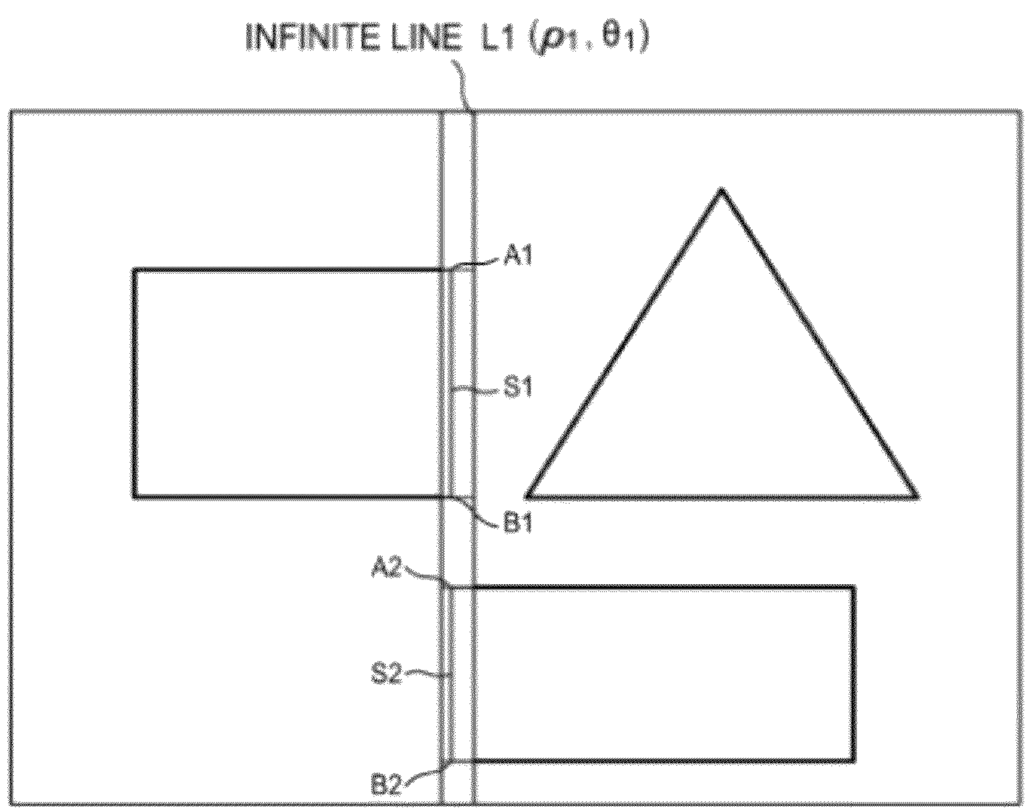
FIG. 26 is a diagram showing an embodiment of matching between an edge image and an infinite line image.

FIG. 26 is a diagram showing an embodiment of matching between an edge image and an infinite line image.

A method of calculating pixels constituting the lines of FIG. 25(B) on the basis of each effective line parameter pair and determining whether the edge image of FIG. 25(A) is present in the pixels may be used as a method of performing matching between the edge image and the infinite line image.

For example, it is assumed that in FIG. 26, an infinite line restored using an effective line parameter pair (ρ1,θ1) is L1. The matching unit 350 can calculate a plurality of pixels constituting the infinite line L1.

Furthermore, the matching unit 350 checks whether the edge image of FIG. 25(A) is present in each of the plurality of pixel. If the edge image of FIG. 25(A) is present in a pixel of the infinite line L1, the pixel corresponding to its coordinates is considered to be a point constituting a finite line image. In contrast, if the pixel constitutes the infinite line L1 but the edge image of FIG. 25(A) is not present in the pixel, the pixel does not correspond to a point constituting a finite line image.

The matching unit 350 can acquire pixels constituting the segments S1 and S2 of the infinite line L1, in which the edge image is present. Furthermore, the matching unit 350 can also acquire the coordinates of the start points A1 and A2 of the segments S1 and S2 and the coordinates of the end points B1 and B2 of the segments S1 an S2. The matching unit 350 stores, for the infinite line L1, information about the coordinates of the start points A1 and A2 and the end points B1 and B2 in the memory unit 370.

The output unit 360 can draw the infinite line L1 using the information about the effective line parameter (ρ1,θ1) stored in the memory unit 370 later, and can acquire the segments S1 and S2 using the coordinates of the start points A1 and A2 and the coordinates of the end points B1 and B2, which were stored for the infinite line L1.

Figure 27:
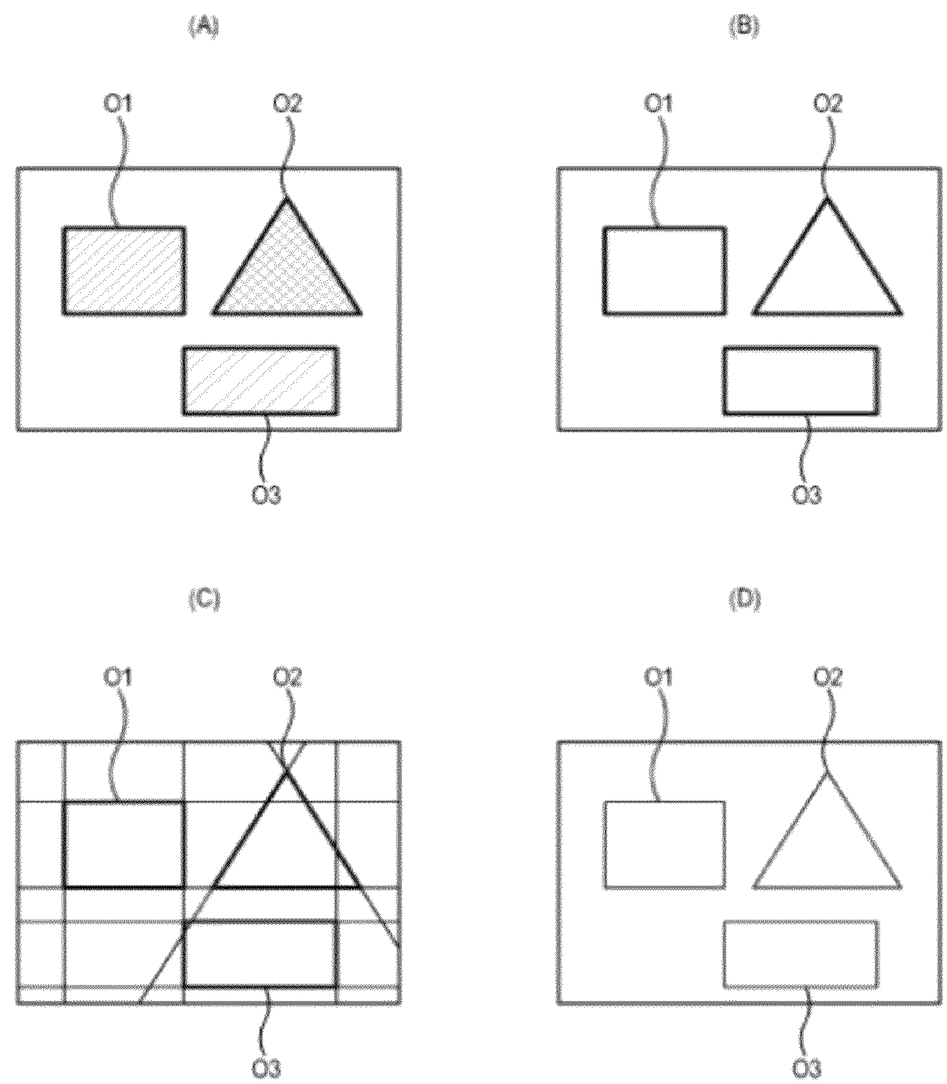
FIG. 27 is a diagram showing images processed by the image processing apparatus according to the present invention.

FIG. 27 is a diagram showing images processed by the image processing apparatus according to the present invention.

FIG. 27(A) corresponds to an original image that the image processing apparatus 300 according to the present invention receives from the camera 400. The received original image includes a triangle object O1 and two rectangles O2 and O3.

FIG. 27(B) shows an edge image that is created by the edge creation unit 320 of the image processing apparatus 300 based on the original image. As shown in this drawing, in this edge image, information about the insides of the objects present in the original image is not present and only the edge information of the objects is present.

FIG. 27(C) shows an image that is restored using line parameters acquired using the Hough transform and the effective line parameter detection. In an image restored using only effective line parameter information, only infinite lines that are formed by extending the segments of each object can be present.

It is impossible to accurately extract information about the shapes or sizes of the objects O1, O2 and O3 using such infinite lines. In particular, although the right side of the rectangle object O2 and the left side of the rectangles O3 are segments that must be distinguished from each other, they are considered to be a single infinite line in the image of FIG. 27(C).

FIG. 27(D) corresponds to an image restored using line parameters and information about the start and end points of lines. This drawing indicates that since information about the start and end points of the lines is present, the right side of the rectangle O2 and the left side of the rectangle O3 can be distinguished from each other. Using such an image, the shapes or sizes of the original image can be accurately determined.

As described above, when the image processing method and apparatus according to the present invention are used, a process of receiving an image from a camera, transforming the image into an edge image and extracting line components can be performed using a single small-sized hardware apparatus. From the point of view of the entire system efficiency, this has advantages of, in a system for performing object recognition using line detection, lane detection, or the like, eliminating the use of system resources required for line detection and concentrating on a high-level algorithm. As a result, the problem of speed in line detection is solved, so that an advantage of considerably improving the speed of the image processing apparatus can be achieved.

Furthermore, when the image processing apparatus according to the present invention is used, the Hough transform can be performed on images in real time, so that the present invention can be applied in various industrial fields that require line information detection. The image processing apparatus and method according to the present invention can be an actual solution in many application fields in which the Hough transform has not been used due to the existing limitations on performance speed and memory.

Furthermore, since the image processing method and apparatus for detecting the start and end points of lines according to the present invention can determine the starts and ends of image lines, the sizes and shapes of actual objects can be determined using only line information in the fields such as the field of object recognition. The present invention can be applied to intelligent robots that travel on the basis of image information captured using a camera, and car travel assistant devices that detect lanes.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An image processing apparatus for detecting lines of images, comprising:

an edge creation unit for creating an edge image using external image data input from an outside;

a Hough transform unit for performing a Hough transform on information about pixel coordinates of the edge image created by the edge creation unit; and an effective parameter detection unit for detecting lines of the edge image by checking effective line parameters using results of the Hough transforms, wherein the Hough transform unit performs the Hough transform on a plurality of edge points for e values in a predetermined range by calculating the following equation:

$$x \cos \theta + y \sin \theta = \rho$$

where x and y are x and y coordinates values of each edge point, respectively, wherein the Hough transform unit increases a value of a parameter cell corresponding to ρ and θ acquired using the Equation, by 1, wherein the effective parameter detection unit determines a parameter corresponding to each cell of the parameter memory to be an effective parameter if a value of the cell of the parameter memory is equal to or greater than a predetermined value.

2. The image processing apparatus as set forth in claim 1, further comprising:

an edge list for storing coordinates of effective pixels constituting the edge image created by the edge creation unit; and a line parameter list for storing the effective line parameters checked by the effective parameter detection unit.

3. The image processing apparatus as set forth in claim 1, wherein the Hough transform unit performs a plurality of calculations of the equation at one time in a parallel manner.

4. The image processing apparatus as set forth in claim 1, wherein the Hough transform unit comprises a plurality of trigonometrical arithmetic units and basic arithmetic units in order to perform a plurality of calculations of the equation in a parallel manner.

5. The image processing apparatus as set forth in claim 1, wherein the effective parameter detection unit searches for a cell having the maximum of values of a plurality of parameter memory cells in a predetermined region of a parameter space and determines the found cell to be the effective parameter if a value of the found cell is greater than a reference value.

6. The image processing apparatus as set forth in claim 5, wherein the effective parameter detection unit comprises:

a first the maximum value calculator for receiving values of the plurality of parameter memory cells for each clock and outputting a maximum value stored in a parameter memory cell having the maximum value;

a plurality of registers for temporarily storing maximum cell values output by the first the maximum value calculator;

a second maximum value calculator for outputting the maximum of the maximum cell values stored in the plurality of registers; and a reference value comparator for comparing the value output from the second maximum value calculator with the reference value.

7. The image processing apparatus as set forth in claim 6, wherein the plurality of registers has a shift register configuration.

8. An image processing apparatus for detecting start and end points of lines, comprising:

an edge creation unit for creating an edge image using external image data input from an outside and storing it in memory;

a Hough transform unit for acquiring line parameters by performing a Hough transform on information about pixel coordinates of the edge image created by the edge creation unit; and a matching unit for detecting start and end points of an infinite line image represented by the detected line parameters using the edge image stored in the memory unit, wherein the Hough transform unit performs the Hough transform on a plurality of edge points for θ values in a predetermined range by calculating the following equation:

$$x \cos \theta + y \sin \theta = \rho$$

where x and y are x and y coordinates values of each edge point, respectively.

9. The image processing apparatus as set forth in claim 8, wherein the matching unit acquires only pixels matching the stored edge image from pixels of an infinite line image represented by the line parameters by matching the infinite line image with the edge image, and checks start and end points of segments formed by the matching pixels.

10. The image processing apparatus as set forth in claim 9, wherein the matching unit performs the process of acquiring only pixels matching the edge image from pixels of the infinite line image by matching the infinite line image with the edge image and checking start and end points of the segments formed by the matching pixels for each of the line parameters.

11. The image processing apparatus as set forth in claim 8, further comprising an effective parameter detection unit for detecting effective line parameters from the line parameters on which the Hough transform has been performed.

12. The image processing apparatus as set forth in claim 11, further comprising:

an edge image storage unit for storing coordinates of effective pixels constituting the edge image created by the edge creation unit; and an effective line parameter list for storing the effective line parameters checked by the effective parameter detection unit.

13. The image processing apparatus as set forth in claim 8, wherein the Hough transform unit performs a plurality of calculations of the equation at one time in a parallel manner.

14. The image processing apparatus as set forth in claim 13, wherein the Hough transform unit increases a value of a parameter cell corresponding to ρ and θ acquired using the Equation, by 1.

15. The image processing apparatus as set forth in claim 14, wherein the effective parameter detection unit determines a parameter corresponding to each cell of the parameter memory to be an effective parameter if a value of the cell of the parameter memory is equal to or greater than a predetermined value.

16. The image processing apparatus as set forth in claim 15, wherein the effective parameter detection unit searches for a cell having the maximum of values of a plurality of parameter memory cells in a predetermined region of a parameter space and determines the found cell to be the effective parameter if a value of the found cell is greater than a reference value.

* * * * *